(12) United States Patent  (10) Patent No.: US 7,274,790 B2
Ryan et al.  (45) Date of Patent: *Sep. 25, 2007

(54) SCRAMBLING AND DESCRAMBLING A HIGH DEFINITION TV SIGNAL

(75) Inventors: John O. Ryan, Woodside, CA (US); James R. Holzgrafe, Morgan Hill, CA (US); Mark A. Hollar, Palo Alto, CA (US)

(73) Assignee: Macrovision Corporation, Santa Clara, CA (US)

( * ) Notice: Subject to any disclaimer, the term of this patent is extended or adjusted under 35 U.S.C. 154(b) by 914 days.

This patent is subject to a terminal disclaimer.

(21) Appl. No.: 10/356,327

(22) Filed: Jan. 31, 2003

(65) Prior Publication Data

US 2004/0047469 A1  Mar. 11, 2004

Related U.S. Application Data

(63) Continuation of application No. 09/483,594, filed on Jan. 14, 2000, now Pat. No. 6,542,609.

(51) Int. Cl.
*H04L 9/00* (2006.01)
*H04N 7/167* (2006.01)

(52) U.S. Cl. ...................................... 380/210; 380/287
(58) Field of Classification Search ................ 380/210, 380/200, 205, 206, 251, 287, 221
See application file for complete search history.

(56) References Cited

U.S. PATENT DOCUMENTS

| | | | |
|---|---|---|---|
| 4,095,258 A | 6/1978 | Sperber | |
| 4,330,794 A | 5/1982 | Sherwood | |
| 4,631,603 A | 12/1986 | Ryan | |
| 5,040,211 A | 8/1991 | Schreiber | |
| 5,138,659 A | 8/1992 | Kelkar et al. | |
| 5,161,188 A | 11/1992 | Pires | |
| 5,311,543 A | 5/1994 | Schreiber | |
| 5,438,620 A | 8/1995 | Ryan et al. | |
| RE35,078 E | 10/1995 | Ryan | |
| 5,504,815 A | 4/1996 | Ryan et al. | |
| 5,553,140 A * | 9/1996 | Kubota et al. | 380/210 |
| 5,579,390 A | 11/1996 | Ryan et al. | |
| 5,608,799 A | 3/1997 | Ryan et al. | |
| 5,671,278 A | 9/1997 | Pires | |
| 5,841,863 A | 11/1998 | Ryan et al. | |
| 5,844,988 A | 12/1998 | Ryan et al. | |
| 6,091,822 A * | 7/2000 | Mellows et al. | 380/210 |
| 6,542,609 B1 * | 4/2003 | Ryan et al. | 380/210 |
| 6,570,990 B1 * | 5/2003 | Kohn et al. | 380/213 |

* cited by examiner

*Primary Examiner*—Matthew B Smithers
(74) *Attorney, Agent, or Firm*—Morrison & Foerster LLP

(57) ABSTRACT

Method and apparatus for scrambling a high definition television signal to discourage unauthorized recording of same. While recording per se is not prevented, the resulting recorded signal is rendered unusable due to an induced "wobble" between the active video and the associated sync pulses. The scrambled television signal is readily viewable on a compliant high definition television set which descrambles the HDTV signal using an encoded indication of the amount of wobble accompanying the HDTV signal. Also provided is a special interface to prevent unauthorized persons from using the indication of the amount of wobble so as to defeat the scrambling. Also provided are method and apparatus for defeating the scrambling method and hence allowing recording of the scrambled video signal.

61 Claims, 15 Drawing Sheets

SCRAMBLING AND DESCRAMBLING A HIGH DEFINITION TV SIGNAL

CROSS-REFERENCE TO RELATED APPLICATIONS

This application is a continuation of U.S. patent application Ser. No. 09/483,594 filed Jan. 14, 2000, now U.S. Pat. No. 6,542,609 issued Apr. 1, 2003.

FIELD OF THE INVENTION

This disclosure relates to high definition television (HDTV) and more particularly to preventing unauthorized recording of HDTV signals.

BACKGROUND OF THE INVENTION

There is a need for High Definition Television (HDTV) output signals from DVD players and other such video source devices. However, the Hollywood movie industry wants to provide copy protection on these High Definition (HD) output signals that performs the same function as the known Macrovision Corp. Anti-copy Process (ACP) present on the NTSC or PAL television output signal of virtually every DVD player now in existence. One version of the Macrovision ACP is described in U.S. Pat. No. 4,631,603.

The technical problem is conveying HDTV analog signals from a DVD player or set-top cable TV decoder box to a TV set. If the video is in the clear, it is subject to being copied by HDTV video recorders, or to being converted to NTSC or PAL TV and then being copied on conventional VHS and 8 mm video recorders. Watermarking—with appropriate detection circuitry in future compliant recorders—has the potential to solve this recording problem to the extent that it provides a means to convey copy control information, (although it will not help with the NTSC/PAL converter problem). However, a viable watermarking technology has yet to be defined and adopted. In addition, watermarking does not address potential recording devices which are not compliant with the watermarking system; whereas, this disclosure addresses those non-compliant recording devices.

SUMMARY

This disclosure is directed to a method and apparatus for providing simple and inexpensive yet highly secure scrambling for high-definition television analog signals, to prevent those television signals from being recorded on an unauthorized basis. In this context, "prevention" is defined not as preventing recording per se, but as removing the commercial entertainment value (viewability) of any resultant recording and thus inhibiting recording. Descrambling occurs only in the display device (TV set), so that the descrambled picture may be watched (in real time) but not usefully recorded.

Because in the present scrambling method a position modulation signal is conveyed in a non-recordable manner from the DVD player or other source to the TV set, the present "High Definition PhaseKrypt" (HDPK) scrambling method uses a real-time transaction between the two for descrambling. Consequently, protection against copying using off-the-shelf video recorders is inherent. In other words, even if the Y (luminance), Cr (red chrominance, equal to R-Y), and Cb (blue chrominance, equal to B-Y) components of the scrambled HDTV signal were recorded with perfect fidelity on any compatible recording device, the replayed image would be unwatchable because the crucial descrambling information would have been lost.

If the scrambled video is converted to NTSC or PAL TV using a VGA to NTSC/PAL converter, the converted signal will produce unwatchable images, again because the crucial descrambling information would be lost. If the converted signal is recorded on a VHS or 8 mm video recorder, the replayed signal will also produce unwatchable images.

Further, there is provided a special electrical interface between HDPK-compliant source devices (e.g., a DVD player or set top decoder box) and the HDTV set by which an end-of-frame (or other location) decoding pulse of the HDPK signal is rendered "invisible" to standard recording devices. This interface behaves like—and indeed it is—a standard 1 volt 75 ohm video interface at all times except for the few microseconds prior to the beginning of each vertical blanking interval when the decoding pulse is being transmitted.

This disclosure also describes how to permit recording of video signals scrambled using the HDPK video security process. Note that practice of such techniques to record copyrighted material would likely violate criminal provisions of the Digital Millennium Copyright Act.

DETAILED DESCRIPTION

High Definition PhaseKrypt

Figure 1:
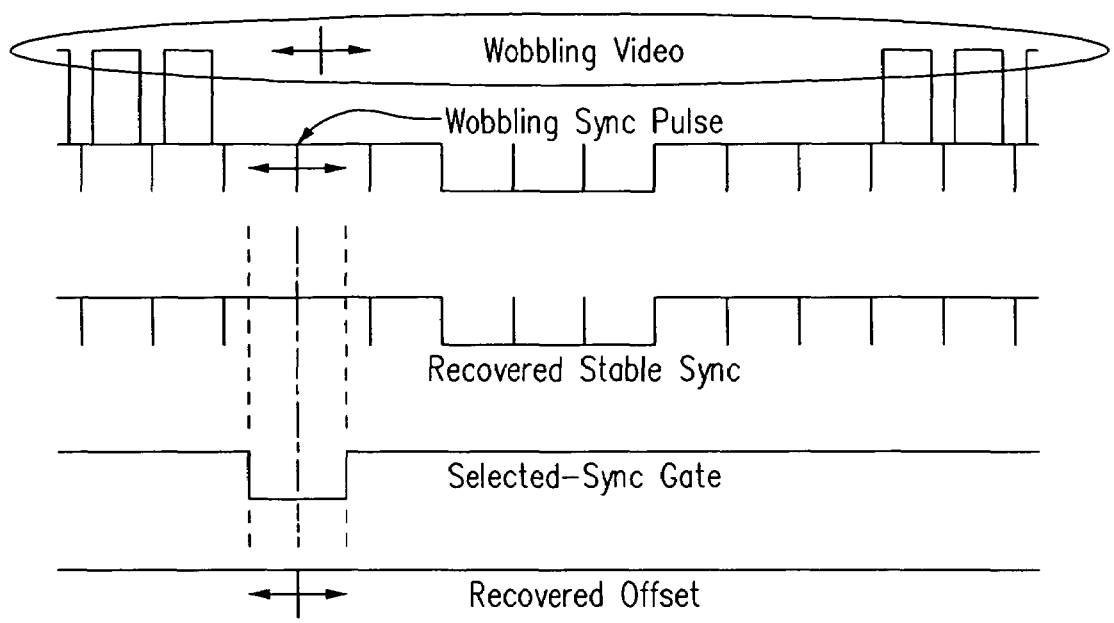
FIG. 1 shows a selected sync pulse carrying offset information for HDPK.

This disclosure is of a variation of the known PhaseKrypt® (PK) scrambling technology—the variation being called here HDPK (High Definition PhaseKrypt)—which provides a good balance between cost of deployment and security for analog HD applications and thereby offers a solution to the present HD-output concerns of the manufacturers and copyright owners.

A scrambling system (offered by Macrovision Corp.) used in cable systems and certain video projection systems is known as PhaseKrypt® (PK). The present inventors have determined that their method and apparatus, relating to PK, offers advantages for protecting HD analog video in transit from source devices (such as DVD players or set-top decoders) to TV sets, from being copied by various recording devices. In particular, the ease with which a TV set can render a PK-encoded signal viewable without having to go through the considerable complexity and cost of formally descrambling the signal, coupled with the relatively high security provided by the PK scrambling, make it well suited to HDTV as determined by the present inventors.

Conventional PhaseKrypt is described in U.S. Pat. Nos. 5,608,799, 5,579,390, 5,504,815, 5,438,620, 5,844,988, RE35078, and 5,841,863, all incorporated herein by reference. PK is an analog video scrambling technology developed by Macrovision Corp. for cost-sensitive conventional TV applications requiring greater security than that provided by simple sync-suppression or video inversion schemes. It takes advantage of the ability of TV sets to display perfect pictures even when presented with video signals having substantial time base errors. It provides a very high security/cost benefit ratio for analog video scrambling systems.

In NTSC and PAL (non HDTV) conventional PhaseKrypt, the video signal is scrambled by position-modulating (time shifting) the active video in each scan line with respect to unchanged sync (synchronization) and color burst signals, by a few microseconds peak to peak. (The sync and color burst are considered to be the video line timing reference.) The modulating signal is usually a pseudo-random noise-like signal band limited to about 20 Hertz. To effect PK scrambling, for convenience the video is first digitized and separated into its RGB or YUV components and is then position modulated in the digital domain. Finally, the video is converted back to the appropriate composite analog format for transmission. PK scrambled video exhibits an extremely annoying horizontal "wobble". Although the underlying video is quite recognizable, the wobble removes all entertainment value from a video program.

The traditional (non-PK) and usual technique for descrambling a video signal scrambled in this manner would be to re-digitize the video, separate it into its components again and then subject it to further position modulation using the inverse of the original noise signal.

PK—by intention—lends itself to a much simpler descrambling solution and this is its main advantage. Instead of applying the inverse position modulation, with all the signal processing complexity, cost and signal degradation inherent in doing so in a low cost consumer product, effective descrambling is accomplished by replacing the sync and burst signals with new sync and burst which have been position-modulated in exact synchronism with the video. The resultant "descrambled" video will now have time base error ("wobble"), but if the time base errors occur at low enough rates, they will have no effect on the image produced by a TV set. In other words, the normal action of a TV set's horizontal AFC loop negates the wobble and presents a stable image.

Sync and burst position-modulation can readily be accomplished using relatively simple analog circuitry, thereby allowing for low cost descrambling. In order to descramble PK video, the descrambler must be provided with full details of the time shifting (noise) waveform used in the scrambler. In a practical application this would normally be accomplished using traditional secure encryption and conditional access technology. Special precautions are taken to ensure that the time shifting (noise) waveform cannot be deduced from the scrambled video, so that the security of the whole system is essentially predicated on the security of the conditional access system.

A further significant advantage of the PK approach is that the video signal is not subjected to complex video processing during the descrambling process, thereby minimizing excess signal degradation. In contrast, other secure analog video scrambling techniques, such as line cut-and-rotate and line shuffling, require that the video be digitized in the decoders to permit descrambling, followed by reconversion to the required analog format procedures which entail considerable cost/performance tradeoffs. The ability to descramble a PK signal with minimal video processing becomes even more important for consumer HD video applications.

One proposed method for protecting HD signals (not using PK) adds different, random DC offsets to each of the three components (RGB, YPrPb, etc.) in an individual line or group of lines. The method transmits the values of the injected offsets separately and subtracts/removes the offsets at the receiving end. This essentially injects a very objectionable chroma noise, similar to conventional "clamp noise", which is in principle then removed by the descrambler. Unfortunately, descrambling this process requires an exact match of each offset between the transmitting and receiving ends. This is quite difficult to do in practice, both because of the inherent difficulty in matching physically different and physically separated components to the requisite accuracy and because of the deleterious effects of any non-linearity in the transmission path. Any failure to adequately do so will result in an objectionable residual level of chroma noise. The present inventors believe that a time base system (of the PK type) does not suffer from these amplitude based errors caused by non-linearities in the transmission path.

Differences between HDPK and the conventional PK are discussed hereinafter. HDPK uses a higher frequency pseudo-random noise signal for position modulation—e.g., in the 50 to 200 Hertz range. This frequency is equal to the field or frame refresh rate of the particular HDTV format. In the case of conventional (prior art) PK, the pseudo-random noise signal is constrained to less than 20 Hertz (less than the refresh rate) to ensure that standard (non HD) TV sets' horizontal AFC (automatic frequency control) loops can faithfully track it to ensure wobble-free displayed images. In the case of HDPK, new TV set circuit designs ("compliant" HDTV sets) will be needed to descramble the video signals. Therefore, the higher frequency wobbles can advantageously be used. The wobble is applied identically, in one embodiment, to each of the Y, Cr and Cb components of the video signal and, as in the case of standard PK, is applied symmetrically about the nominal line position.

Along with the Y, Cr and Cb component signals, HDPK utilizes the H/V sync (horizontal/vertical synchronization) signal typically added to the Y video component in HDTV. The horizontal sync component is not position modulated (time shifted). Its leading edge is phased to coincide with the beginning of the unwobbled horizontal blanking interval.

Because the position modulation signal is conveyed directly from the DVD player (or other source) to the TV set, HDPK uses a real-time transaction between the two to permit descrambling. Consequently, protection against recording using off-the-shelf video recorders is inherent. In other words, even if the Y, Cr, Cb and sync components of the HDPK signal were recorded with perfect fidelity on any compatible recording device, the replayed image would be unwatchable because the crucial descrambling information would be lost during recording.

As discussed above, if the scrambled video is converted to NTSC or PAL using a VGA to NTSC/PAL converter, e.g., the converted signal will produce unwatchable images, again because the crucial descrambling information would be lost. If the converted signal is recorded on a VHS or 8 mm video recorder, the replayed signal will also produce unwatchable images for the same reason.

If future HDTV sets complying with HDPK were to provide NTSC or PAL video output signals from HD video input signals, these NTSC or PAL output signals would not be watchable or recordable, because, as explained above, a compliant HDPK TV set does not formally descramble the HDPK signal.

HDPK scrambling is achieved by applying a process related to the known PhaseKrypt process to the digital video signal components at the source device. The HDPK wobble (unlike conventional PK) is field- or frame-static, in the sense that each scan line in a complete field or frame is given a constant horizontal offset (wobble); successive fields or frames are given differing, random or pseudo-random offsets, but once assigned, the offset is not changed until the next field or frame. The offset in one embodiment is applied in increments of an integral number of pixel widths according to the underlying digital video representation; this is not limiting. For instance, if the underlying video sample rate is 14.3 MHz, the video would be offset in increments of approximately 70 nsec, or integral multiples thereof. The value of the offset is encoded in the video signal in some convenient fashion such that the encoded information is irrevocably lost when the signal is recorded. The recording thus made is useless since the randomly varying horizontal offset makes the picture "wobble" in a very objectionable manner.

The associated descrambler circuit may be connected at any convenient location in the compliant HDTV set, and may be integrated with other video processing circuits in the HDTV set. Of course, there is no actual descrambling in the formal sense for HDPK, as explained above. Note that with HDTV, each component (CR, G, B or Y, Cb, Cr) has its own cable (conductor) into the HDTV set; such a descrambler circuit need only be provided for the component carrying the wobble data.

The HDPK wobble is applied identically to the Y, Cr and Cb components of the signal and, as in the case of conventional PK, is normally applied symmetrically about the nominal line position. Since the wobble (offset) changes from field to field (or frame to frame) in increments of an appropriate clock period and remains constant throughout the field, encoding (scrambling) is intrinsically simple in the digital video domain. One embodiment of the HDPK scrambling process is suitable straight-forward manipulation of the read vs. write address and/or timing in a conventional digital video output buffer, followed by suitable coding of the offset values and insertion thereof into the resultant video at a predetermined location.

One method of coding the offset values (wobble) is by modulating one edge of one particular sync pulse in each field/frame with the exact offset of the following field/frame, such that, if all sync pulses in that next field/frame were position-modulated to track that edge exactly, the active video would be stable with respect to those sync pulses. In one embodiment, as shown in the upper waveform of FIG. 1, the sync pulse to be so modulated ("wobbling sync pulse") is the second sync pulse occurring (in the vertical blanking interval) after the last line of active video in each field or frame; that is, the first sync pulse after the first line in the vertical blanking interval. FIG. 1 also shows the accompanying wobbling active video as several lines of active video before and after the vertical blanking interval.

The second waveform in FIG. 1 is the associated recovered stable (i.e., conventional, unmodified) sync pulses. The third waveform is the selected-sync gate pulse which is used as a control signal to extract the selected sync pulse. This gate pulse is easily generated internally in the descrambler (decoder) since the location of the selected sync pulse is predetermined as being, e.g., the second sync pulse in the vertical blanking interval. The last waveform shows the recovered/descrambled offset which has been determined from the selected sync pulse which was extracted from the first waveform using the third waveform.

For those HDTV formats in which the horizontal sync pulses are bi-level (as in PAL and NTSC), the chosen sync pulse edge for encoding the wobble is preferably the leading sync pulse edge; for HDTV formats in which the horizontal sync pulse is tri-level (see FIG. 2), the selected sync pulse edge is preferably the first negative-going edge. Digital recording formats typically digitize only the region of the video waveform corresponding to active picture information, e.g., 0 IRE to 100 IRE; however, the digitized region typically extends a small ways outside this region—for instance, 0 IRE corresponds to $10_{hex}$ rather than $00_{hex}$.

Figure 2:
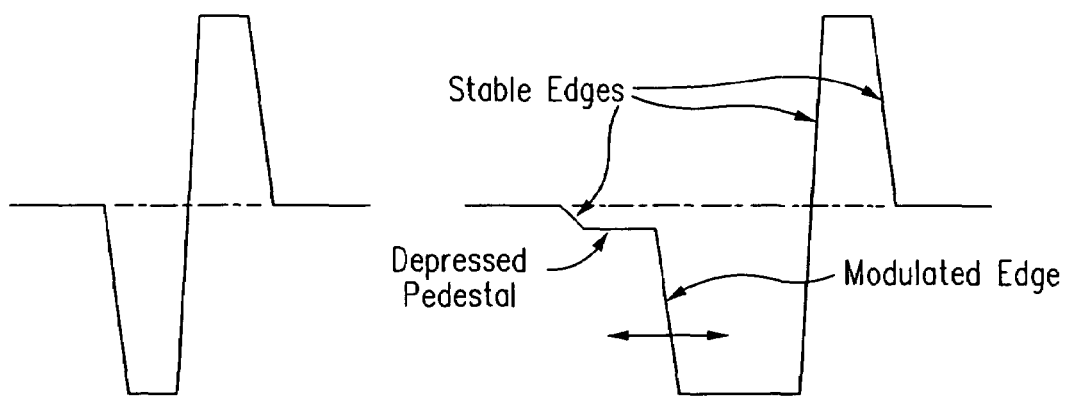
FIG. 2 shows a tri-level pulse used in the high definition video signal of FIG. 1.

To prevent such recording formats from recording the onset of the modulated (selected) edge, that edge is preceded by a depressed pedestal with a stable edge at its beginning. FIG. 2 shows (left side) a standard tri-level sync pulse of the type used in some HDTV formats and (right side) a modulated tri-level sync pulse which carries the wobble information ("modulated edge"). Thus, the onset of the modulated edge, as shown, falls outside the digitized region and is thereby prevented from being digitally recorded. In the one embodiment, all other sync pulses present conform to the appropriate HDTV standard.

Descrambling a legitimate (non-recorded) HDPK scrambled signal requires only recovery of the offset value from the modulated sync pulse edge and adjustment in real time of either the horizontal centering or the horizontal timing of the display device's (TV set) deflection or pixel addressing system, such that the HDPK induced wobble on the video signal is canceled and the displayed image is stable.

Figure 4A:
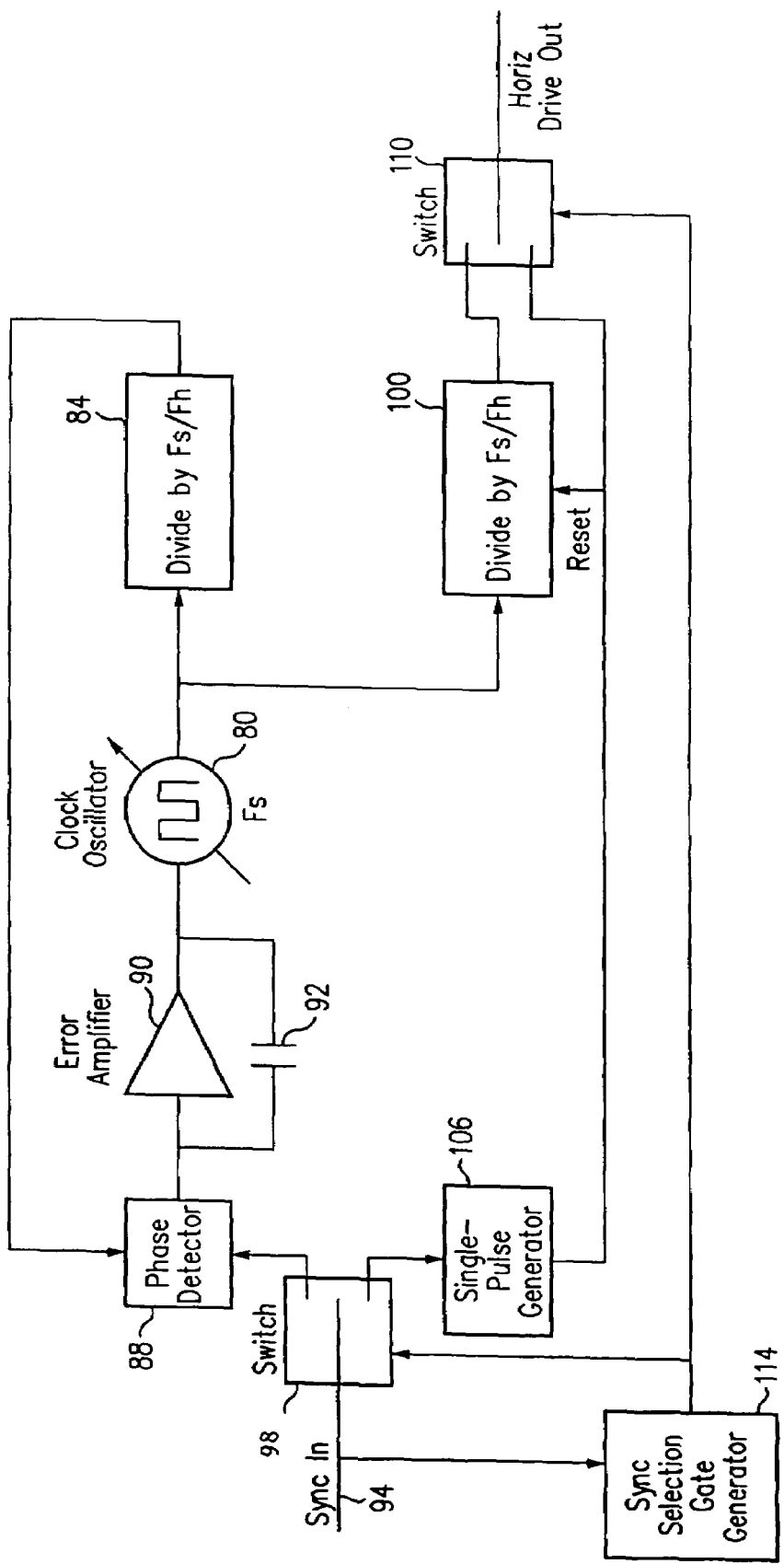
FIG. 4A shows a block diagram of an HDPK descrambler.
Figure 4B:
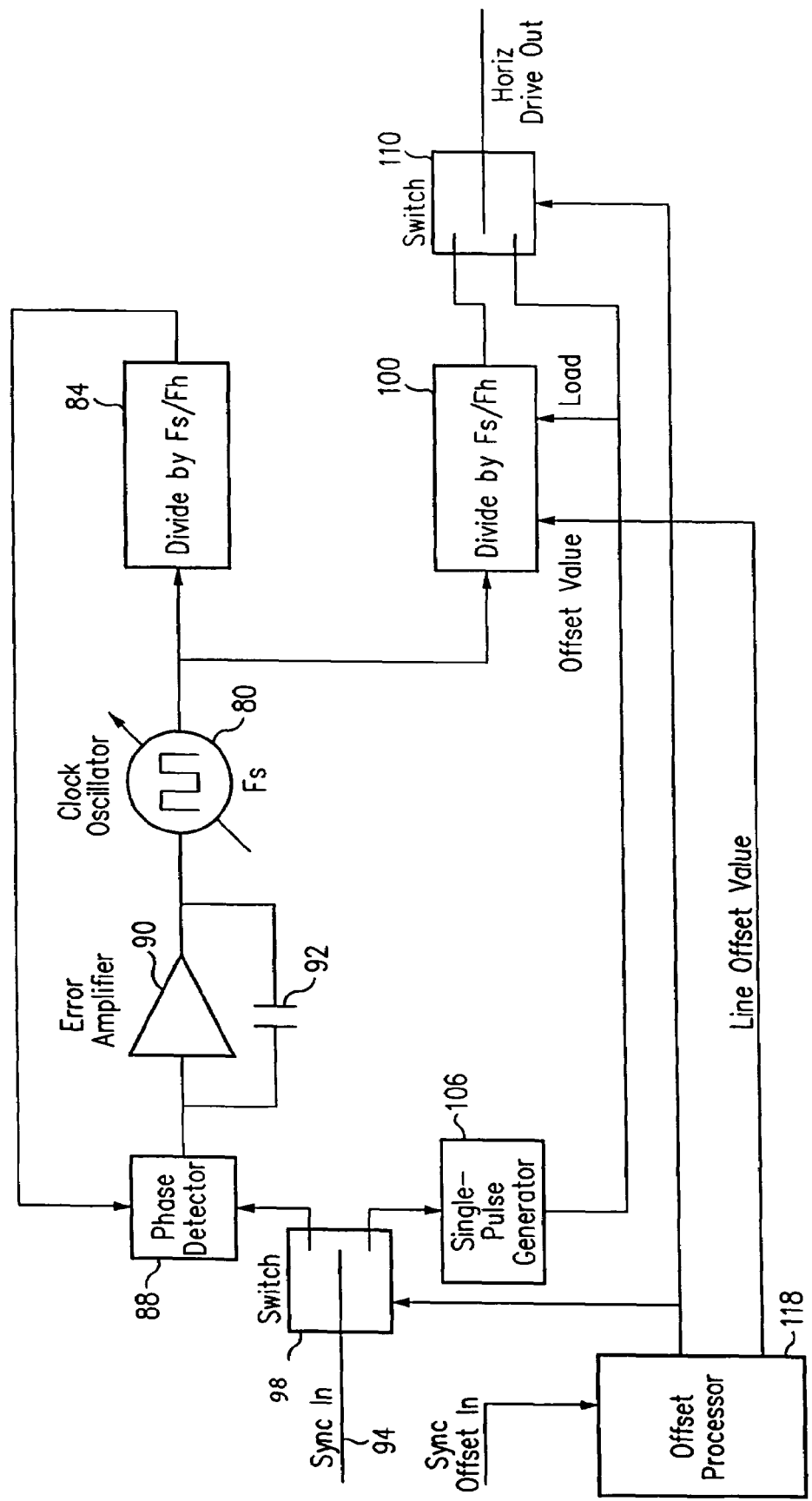
FIG. 4B shows an alternate HDPK descrambler.
Figure 5:
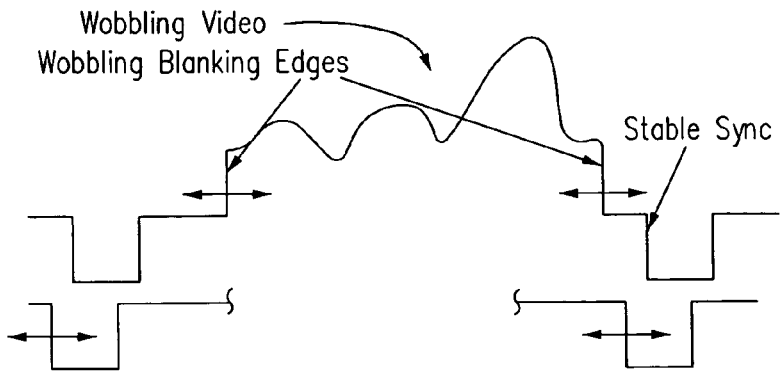
FIG. 5 shows an attack on the HDPK scrambling by blanking edge tracking.

An exemplary circuit to encode HDPK (a scrambler) is of the type shown in FIGS. 4 and 5 of the above-referenced U.S. Pat. No. Re 35,078 (originally U.S. Pat. No. 5,058,157) to Ryan, for conventional PK scrambling, and generally would operate in the same way, except for the higher frequency variation in the wobble. The scrambling circuit is located in the HDTV signal source, which is a DVD player or a cable TV set top box, for instance, or a cable TV system head end.

Figure 3:
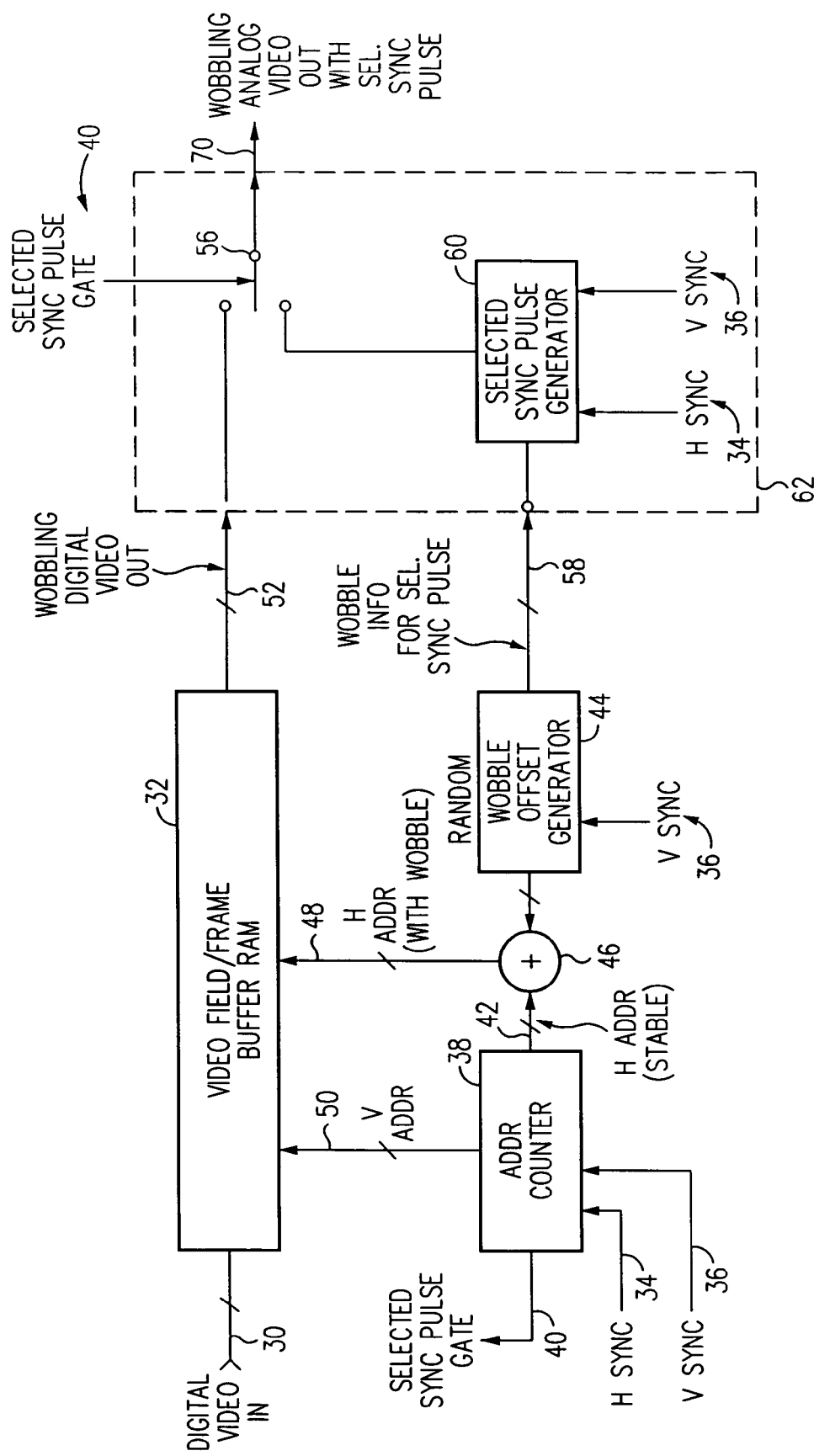
FIG. 3 shows a block diagram of an HDPK scrambler.

FIG. 3 shows such a scrambler in a block level diagram adapted for HDPK. The input standard digital HDTV signal is applied at terminal 30.

Note that this input video on terminal 30 is only the video component carrying the sync pulses, and comes from, e.g., the cable set top box; HDPK is in the typical situation digital video input and analog video output. The input video signal is coupled to video field/frame buffer 32.

The horizontal and vertical sync pulses associated with the input digital video signal are extracted conventionally and applied to terminals 34, 36 of address counter 38. Counter 38 outputs the selected sync pulse gate signal (indicating the general location of the selected sync pulse) on terminal 40 and the stable (non-wobbled) horizontal address on bus 42.

The wobble offset generator 44 generates a psuedo-random noise signal in response to the input vertical sync signal and couples this to summer 46, the output terminal of which carries the horizontal address signal with the wobble on bus 48. The buffer 32 also receives the vertical address signal on bus 50, and outputs the wobbling digital video on bus 52 to switch 56.

The wobble information for the selected sync pulse is output on bus 58 to the selected sync pulse generator 60, which also receives the horizontal and vertical sync pulse signals. The elements inside block 62 may operate in the analog or digital domain, but the output signal on line 70 is the wobbling analog video with the selected wobbling sync pulse. Hence suitable digital to analog conversion is provided for the input signals to block 62 and digital to analog conversion for the video output signal on line 70.

There is a corresponding HDPK descrambler, in the compliant TV set. In one embodiment of the corresponding HDPK descrambler (see FIG. 4A), a stable clock source (oscillator) 80 operating at the video sample rate has its output signal divided or counted down by the number of pixels per line by divider 84 and the resultant line-rate output ("carry-out") pulse is used in a conventional narrow-band phase-locked loop having phase detector 88, error amplifier 90 and associated capacitor 92 to phase-lock the clock oscillator 80 to the conventionally-separated horizontal sync signal. The sync signal is applied at terminal 94 to switch 98.

A second, identical counter 100 is operated from the same clock source 80. The carry-out pulse from the second counter 100 is synchronous to incoming horizontal sync at 94 with a phase relationship which is, at first, undetermined. The selected sync pulse (carrying the wobble data) on each field/frame of the incoming video is thereby separated out by single pulse generator 106 and used to reset or clear the second counter 100 in real time at the end of the field/frame, after which the counter 100 runs normally until it is again reset at the end of the next field/frame. The master clock oscillator 80 may be run at any suitable multiple of the video sample rate, and the divide ratios of the two counters 84, 100 scaled accordingly.

The carry-out pulse of the second counter 100 is supplied to the otherwise conventional TV set's horizontal deflection/addressing system via switch 110 as a "Horizontal Drive Out" signal. Both switches 98 and 110 are controlled by sync selection gate pulse generator 114. Gate pulse generator 114 includes standard video logic circuitry that, from the incoming horizontal and vertical sync pulses, determines the location of the selected (wobbling) sync pulses. Typically, there is only one such selected sync pulse per field/frame, and its location is predetermined, as described above.

Since the frequency of the Horizontal Drive Out signal is exactly that of the incoming video, and the timing (as determined by pulse generator 106) is exactly that of the selected input sync pulse which itself has exactly the correct timing for all scan lines of video until the next such selected sync pulse, the Horizontal Drive Out signal thus generated is exactly that required to give a normal, stable presentation of the video content of the scrambled signal.

Since all current digital video recorders (except the most expensive professional units) employ video compression, and as part of that compression process discard the sync pulses and blanking intervals from the original video signal, the selected sync pulses (which are in the blanking interval) carrying the offset information are not recorded and the resultant recording cannot be descrambled under any reasonable circumstances.

In one embodiment, the FIG. 4A descrambler is incorporated into conventional HDTV synchronization circuitry already present in an HDTV set, and shares elements such as the divide by Fs/Fh with the synchronization circuitry. The encoder (scrambler) may share components with the MPEG decoder in, e.g., the cable set top box, to increment the wobble in integer pixel units and appropriately encode the wobble data.

In all HDTV formats, selection of a particular sync pulse to carry the offset information may not be static field-to-field, and may for instance include randomly selecting a different sync pulse in each field/frame; in such cases the information as to which particular sync pulse carries the offset information is conveyed to the descrambler in any convenient fashion, such as encoded data in the VBI, and may be conveyed in either encrypted or clear form. If the pulse is dynamically selected and the selected pulse precedes the vertical blanking interval, provision must be made to delay or store the position of the pulse until it is applied to the succeeding field/frame; any standard method such as digitizing the value and storing it in a register may be used to accomplish this. The adjustment of the counter 100 which generates the horizontal drive signal may be accomplished in any of several ways known to those skilled in the art; such methods include resetting the counter, presetting the counter to an appropriate value, and decoding the position of the desired horizontal drive pulse numerically, among others.

FIG. 4B is an alternative HDPK descrambler in most respects the same as that of FIG. 4A but for a form of HDPK where the wobble information is not encoded directly as a sync pulse edge location. In FIG. 4B, the sync offset is otherwise extracted from the incoming video signal as the "sync offset in" signal and is connected by offset processor 118 into a numerical value to be applied as a gating pulse to central switches 92, 110, and to reset divider 100.

In those HDTV formats with bi-level sync pulses, the entire selected sync pulse may be position modulated instead of only one edge thereof. (Note that there are several versions of HDTV.) Moreover, other means of adding the offset information to the HDTV signal may be used, such as direct numerical encoding and subsequent addition as a data signal or subchannel (as, for instance, in the above-referenced Macrovision PhaseKrypt patents) with or without encryption; moreover, if the selected sync pulse method is used, the selected pulse may be made non-standard in any suitable fashion in order to augment the effectivity, security and/or non-recordability. For instance, the selected sync pulse might be made narrower to provide more room in the horizontal blanking interval in which to wobble the video signal to a greater extent. Alternatively, the offset information may be conveyed through a separate channel in any convenient fashion, again either encrypted or in the clear.

While difficult and expensive to implement in practice, it is potentially possible to defeat one embodiment of HDPK by detecting and tracking the wobbling moving edges of the active picture area. FIG. 5 thus shows a waveform depiction (upper part) of an HDPK scrambled video signal (one scan line) between two horizontal blanking intervals, where the active video is wobbling, with the blanking edges wobbling but a stable sync pulse. The lower part of FIG. 5 shows the wobbling sync pulses necessary to descramble the upper waveform. The wobbling sync pulses here have been determined from detecting and trading the wobbling edges of the upper waveform.

To protect against this defeat approach, during the scrambling pseudo-video is added to the remainder of the horizontal blanking interval (or a portion thereof) to disguise the edges. This pseudo-video is herein referred to as "edge fill". The principle of edge fill used here is to redefine the stable blanking interval such that no portion of the wobbling actual video extends into the redefined area at any time, with any empty space between the edges of the redefined blanking interval and the edges of the actual, wobbling video filled with a second signal which is functionally indistinguishable from the video, thereby masking the wobbling edge of the true video.

Figure 6:
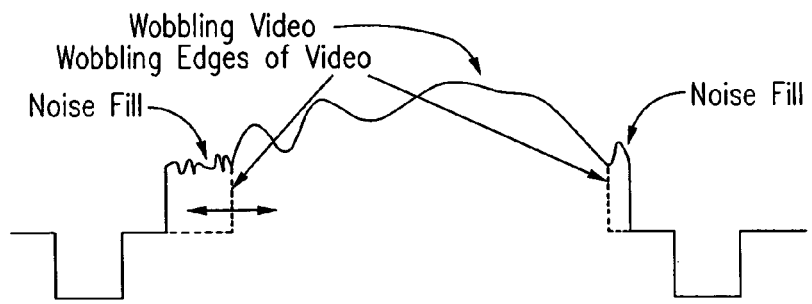
FIG. 6 shows an example of edge fill using noise fill.
Figure 7:
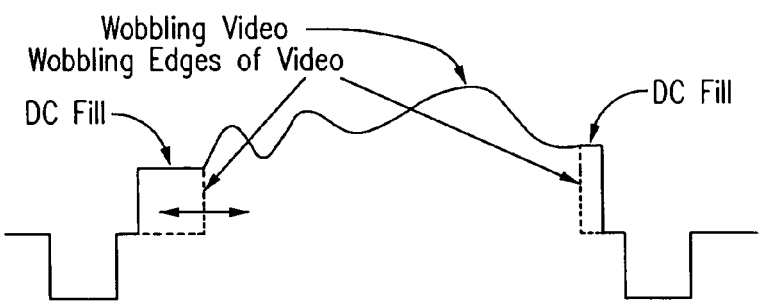
FIG. 7 shows an example of edge fill using DC edge fill.
Figure 8:
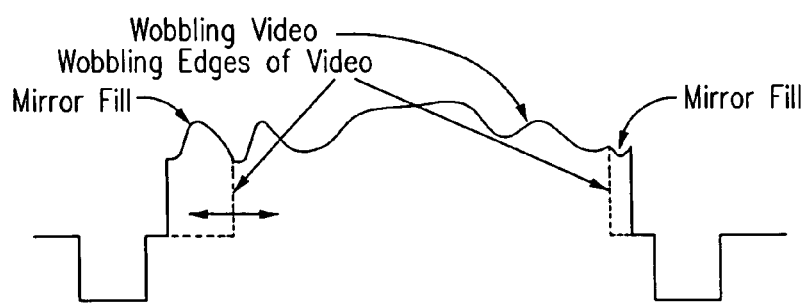
FIG. 8 shows an example of edge fill using mirrored video edge fill.

The added edge fill video is simply discarded (ignored) in the legitimate descrambler. Suitable forms of edge fill include, but are not limited to, "Noise Fill" signals (see FIG. 6), dynamic "DC Fill" levels corresponding to the instantaneous level of the adjacent video edge (see FIG. 7), and "Mirror Fill" video in which the filled region contains a copy of the adjacent video, inverted left-to-right such that there is no step-wise discontinuity at the junction between the real video waveform and the fill video waveform (see FIG. 8). Additionally, the mirrored video may be inverted in polarity as well, such that there is also no slope change at that junction.

An alternative embodiment of HDPK provides a horizontal and vertical sync component signal on a fourth cable to couple the pseudo-random modulating signal from the HDTV source to the TV set in order to minimize descrambling cost. This signal is used in HDPK compliant TV sets (i.e., those having an HDPK descrambler) to position-modulate the horizontal scans, in order to present a stable wobble-free image. Since sync signals are conveyed independently of the active video in the HDTV format, higher levels of position modulation are possible than with PK applied to composite video, yielding more obscured scrambled images.

Perhaps the only obvious defeat of HDPK would be to build a special "black box" circuit which takes the Y, Cr, Cb, H/V sync and the wobble information and uses time-base-error correction techniques to reconstruct wobble-free Y, Cr and Cb signals. Such a black box would involve relatively complex digital video processing techniques and its sale would obviously fall within the criminal provisions of the Digital Millennium Copyright Act's anti-circumvention provisions, there being no non-copyright-infringing reason for its sale or use.

It makes little sense to try to improve the security of HDPK by using encryption techniques to conceal the details of the noise waveform, since all compliant TV sets would need to contain the necessary keys to allow decryption, thereby ensuring a "hack in" (decryption) in short order.

Costs associated with deploying HDPK are minimal. Effecting the pseudo-random position modulation in a DVD player while the video is in the digital domain is probably less complex than applying the well known Macrovision ACP. The increased descrambler circuitry needed in a compliant HDTV set is even less costly.

The security features of HDPK are guided by the fact that regardless of how secure the HDTV signal might be in transit from one device to another, a hacker (pirate) could always remove the rear cover of a HDTV set and have access to clear signals, either on a circuit board or on the grids of the display tube or equivalent. In light of cost issues and the need for easy access for maintenance, it appears unlikely that manufacturers would implement effective physical barriers to such activity. That being so, it makes little sense to impose a large cost burden on manufacturers by proposing a complex HD system which, although nominally highly secure, can be readily compromised by opening up the TV set.

HDPK thus meets the following criteria:

1. The effort required by a hacker to descramble the HDPK signal in order to make clear copies is much greater than that required to intercept descrambled clear video with a TV set, since that is the weak link of all of the alternative proposals.

2. Descramblers for the HDPK signal have no non-copyright-infringing purpose and should be further protected by strong worldwide patents.

3. The scrambled Y, Pr and Pb video signals are not recordable on any existing or conceivable future recording devices in a manner that permits subsequent descrambling in compliant HDTV sets.

For cable TV applications of conventional PK, as described above, details of the wobbling signal used in the scrambler are conveyed to the descrambler during the vertical blanking interval (VBI) using secure encryption techniques, since the intention was to deny access to the video unless the subscriber had an authorized descrambler. The present HDPK scrambling system is for preventing copying of the HDTV signal, not for controlling access to it, since the possessor of a DVD player and one or more DVD discs has already purchased access and expects to be able to view his discs without further ado. Hence, the requirements are different.

The goals in scrambling the HDTV signal are to:

1. Prevent the making of usable copies of the scrambled HDPK signal, not just on currently available recorders, but also on future recorders of any reasonably conceivable design. Since the HDTV set does the descrambling, a faithful copy of the scrambled signal is just as good to the end user as a faithful copy of the clear signal. So the technique used for cable applications of conveying securely encrypted descrambling information in the VBI is inappropriate here, since we can easily envision future recorders capable of faithfully recording the entire scrambled video signal, VBI and all.

2. Prevent illicit descrambling of the HDPK signal outside of the HDTV set, since a clear signal is even more prone to being copied.

One could accomplish the first goal by sending the descrambling information to the TV set on a separate line, either in the clear or using IEEE 1394 ("Firewire") techniques, but both methods add cost—at a minimum, that of the extra connectors. It is both desirable and convenient to combine the descrambling information with one of the video channels, the Y channel for example, but one must do so in a manner that relates the descrambling information invisible to recording devices so that on playback the absence of the descrambling information would-make the copy unviewable.

A special "stealth" secure interface (see below) for use between source devices and HDPK TV sets is disclosed herein to ensure that future recording devices, whether of analog, digital or hybrid design, whether using tape, optical disc, hard-drive or other media, regardless of their performance characteristics or intended purposes, could not record this special end-of-frame pulse, so that recordings made on such devices could never be descrambled.

Considering the second goal, since every compliant HDTV set must be able to descramble this signal, alternative (non HDPK) proposals have an inherent security weakness caused by the fact that clear descrambled HD video is necessarily present within the TV set. Given this fundamental weakness, it is difficult to justify the added cost of encrypting the descrambling information to the HDTV set.

Secure Interface

Figure 9:
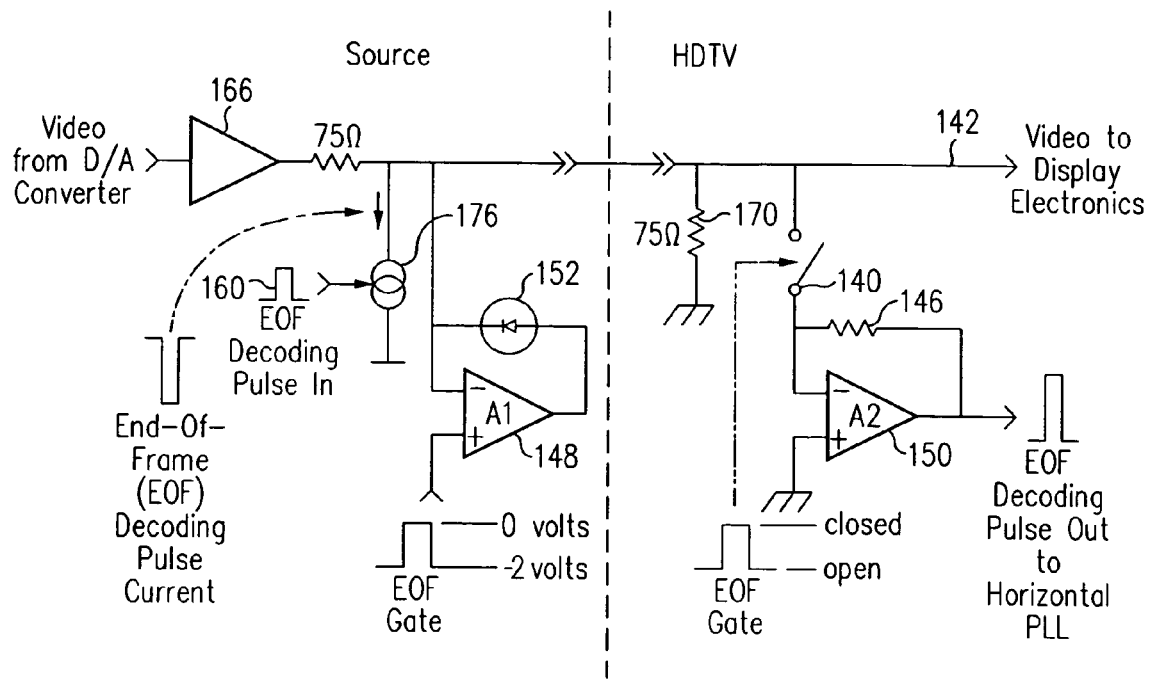
FIG. 9 shows a schematic of an embodiment of the HDPK secure video interface.

FIG. 9 schematically illustrates the above-mentioned secure ("stealth") interface for HDPK which allows for extraction of a stealth sync pulse. Switch 140 at the HDTV set end is held open except for a few microseconds in and around the decoding pulse interval. During switch 140's open period, the interface (video line 142) is a standard 75 ohm connection as shown and the received video (from source output stage 168) is conventionally extracted (as a voltage pulse) from across the 75 ohm termination 170. When switch 140 is closed, the impedance at the 75 ohm termination drops to nearly zero and the current in line 142 is absorbed by feedback resistor 146, thereby reproducing the decoding pulse at (operational) amplifier 148's output terminal (having associated diode 152) as a current pulse.

Since the input impedance at line 142 drops to zero when switch 140 is closed, no voltage (signal) corresponding to the decoding pulse will be seen across the 75 ohm termination 170—the pulse effectively vanishes and reappears at the output terminal of operational amplifier 150 to drive the TV set's horizontal sync PLL (phase locked loop). Thus any recording device connected across line 142 might make a perfect copy of the scrambled video, but the essential decoding pulse would be missing from the recording.

Note that the FIG. 9 interface is used for each video component line (cable) where the sync signal is present.

At the source (e.g., set top box) end, the decoding pulse (located as described above in the VBI at the end of a video field) is injected by current source 176 as a negative current (not voltage signal) into line 142 as shown by the waveform 160. During that time period the voltage at the source end of video line 142 is prohibited from going much below ground potential by the switched "negative clipper" operational amplifier 148. The purpose of this clipping is to prevent the decoding pulse from appearing on line 142 as a voltage pulse and being recorded in the event that the other (HDTV) end of the video line 142 is connected to a recording device with a standard 75 ohm input termination in place of a compliant HDTV set. This negative clipping does not interfere with the reception of the decoding pulse by a compliant TV set, because its clipping level is set to be a safe margin below the voltage at the receiving end during the decoding pulse interval, but still high enough to defeat reliable detection.

Note that in FIG. 9, the EOF (end of field) gate pulse applied to the positive input terminal of amplifier 148 is conventionally generated from the sync separation circuitry at the source (e.g., set top box). The EOF decoding pulse 160 is generated in the scrambler as described above.

Further, the FIG. 9 stealth interface is not intended for use with the descramblers of FIGS. 4A and 4B exactly as shown. That is, FIGS. 4A and 4B represent non-stealth interface descramblers. A descrambler compatible with the stealth interface of FIG. 9 would be simpler, since the EOF decoding pulse out provided by the stealth interface eliminates the need for the single pulse generator 105 of FIG. 4A.

Thus, whether a recording device is connected in place of—or in loop-though fashion with—a compliant HDTV set, no decoding pulse will be detected by the recorder and any resultant recording will therefore be unplayable using the stealth interface.

Thus a future recording device to defeat the stealth interface would have to have a special input circuit to detect the decoding pulse and make usable copies of HDPK video. Such an input circuit could have no significant non-copyright infringing use and hence be illegal under the U.S. Digital Millennium Copyright Act.

Figure 10:
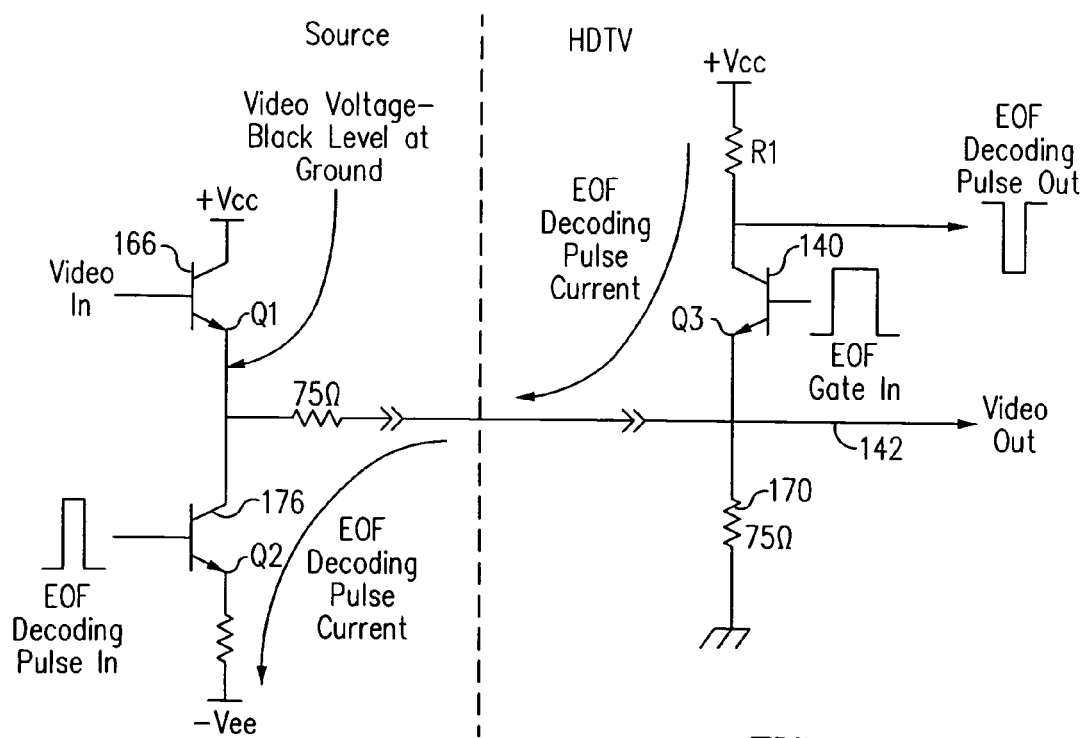
FIG. 10 shows an implementation of the interface of FIG. 9.

DC-coupled video with black level at ground is assumed above, as are bipolar supply voltages. The principle, however, can be readily modified. FIG. 10 shows one alternative to the FIG. 9 circuit, but without the op-amps 148, 150 of FIG. 9. In FIG. 10, the analog video output stage 166 of the video source is an emitter follower transistor Q1. Quiescent current for transistor Q1 is supplied by constant-current source transistor Q2. (Transistors Q1, Q2 correspond approximately to elements 166, 176 in FIG. 9.)

The End of Frame (EOF) current pulse is generated by causing transistor Q2 to increase the quiescent current for transistor Q1 for the duration of the EOF decoding pulse applied to its base, thereafter returning to the normal operating current. Note that the voltage change on the emitter of transistor Q1 will be minimal during this operation (nominally 13 mV for a 2:1 change in current), thereby preventing detection of the EOF decoding pulse by a non-compliant TV set or recording device. At the HDTV set side, the bias voltage on transistor Q3 is set so that transistor Q3 is normally not conducting, even during sync pulses. When the EOF gate in pulse is applied to the base of transistor Q3, however, the voltage on transistor Q3's emitter raises just sufficiently to cut off conduction in transistor Q1. This means that transistor Q1 can no longer supply the extra current that transistor Q2 is sinking, and that current must now flow through transistor Q3. The extra current flowing through transistor Q3 induces a voltage pulse across Q3's collector resistor R1; that (voltage) pulse is the recovered EOF pulse.

In effect, the act of applying the EOF gate in pulse to the base of transistor Q3 causes transistor Q3 to interrogate the source device for the EOF current pulse. The EOF gate in pulse can in principle be detected at transistor Q3's emitter; this does not represent a security risk since the existence and location of the gate in pulse conveys no useful information to a hacker. Here transistor Q3 corresponds to amplifier 150 in FIG. 9 and its base drive corresponds to switch 140.

Output circuits similar to that shown in FIG. 10 can be inexpensively constructed discretely in conventional semiconductor circuitry and could be incorporated into the output line driver or the HD-DAC (high definition digital to analog converter) if HDPK is fully integrated into the next generation TV set IC's; thus circuits similar to those in FIG. 10 are readily incorporated into the existing input video processing of the TV set.

The security goal of "keeping honest people honest" would appear to be more than met by the present HDPK and secure interface since a "hack" requires specialized (and proprietary) signal processing techniques quite beyond the capabilities of most casual or indeed, technically inclined hackers. It is also seen that the alternative proposals employing secure digital video encryption, while in principle capable of providing excellent security while the video is in transit, are readily compromised by a hacker willing to take the back off a HDTV set and engage in some simple signal interfacing. That being so, the much lower hardware costs associated with deploying HDPK make it useful.

Compliant HDTV Set

Figure 11A:
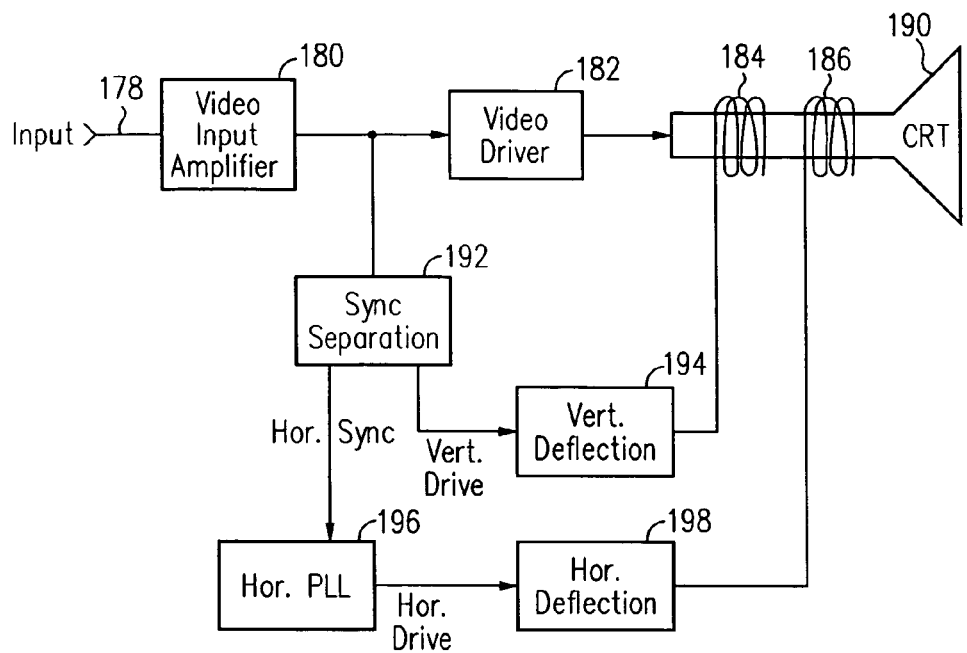
FIG. 11A shows a standard HDTV set.

For purposes of illustration, FIG. 11A shows a block diagram of a non-compliant (conventional) HDTV set that (by definition) does not respond to HDPK. The input analog video HDTV signal is applied to input terminal 178. Note that the illustrated circuitry is only for the component channel carrying the sync signals and the tuner is not shown. The input video component signal is applied to conventional video input amplifier 180 which outputs the amplified signal to video driver 182, which in turn drives the electron gun of cathode ray tube (CRT) 190. The signal output from amplifier 180 is also coupled to the input terminal of conventional sync separator 192 which outputs the separated horizontal sync pulses (H sync) to horizontal phase lock loop 196, which in turn outputs the horizontal drive signal to the horizontal deflection circuitry 198.

The separated vertical drive signal drives the vertical deflection circuitry 194. The vertical deflection circuitry 194 and horizontal deflection circuitry 198, respectively, drive the deflection coils 184 and 186, which are part of cathode ray tube 190. To repeat, this is a conventional HDTV set (only relevant portions are shown) which would not respond to HDPK and hence if provided with an HDPK signal, would display a scrambled picture.

Figure 11B:
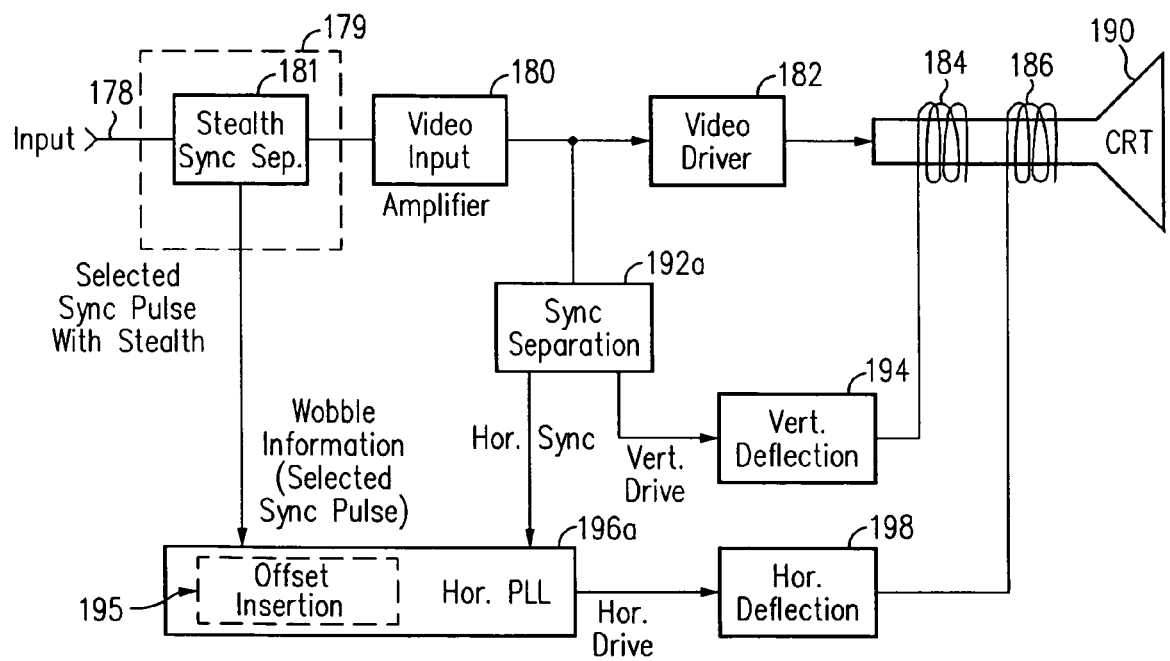
FIG. 11B shows an HDTV set with the stealth interface.

FIG. 11B shows a modified HDTV set, having many elements common to those of FIG. 11A but being compliant to HDPK, that is, capable of descrambling HDPK video. The FIG. 11B HDTV set includes the stealth interface 179, illustrated in FIGS. 9 and 10, including the stealth sync separator 181, which corresponds to elements 140, 146, and 150, for instance, in FIG. 9. FIG. 9 shows the output signal from the amplifier 150 as being the end of field decoding pulse out. This signal is on the line designated wobble information in FIG. 11B being coupled to the horizontal phase lock loop circuitry 196a, which is a modified version of the conventional horizontal phase lock loop circuitry 196 of FIG. 11A. In FIG. 11B the horizontal phase lock loop circuitry 196a includes an offset insertion circuit 195 which is shown as a block. This block corresponds to the functionality of the FIG. 4A decoder, lower portion. Note that the upper portion of the FIG. 4A circuit is the conventional horizontal phase lock loop also shown in FIG. 1B as 196a.

Hence the compliant HDTV set in this embodiment includes the stealth interface of FIG. 9 and the decoder of FIG. 4A.

Figure 11C:
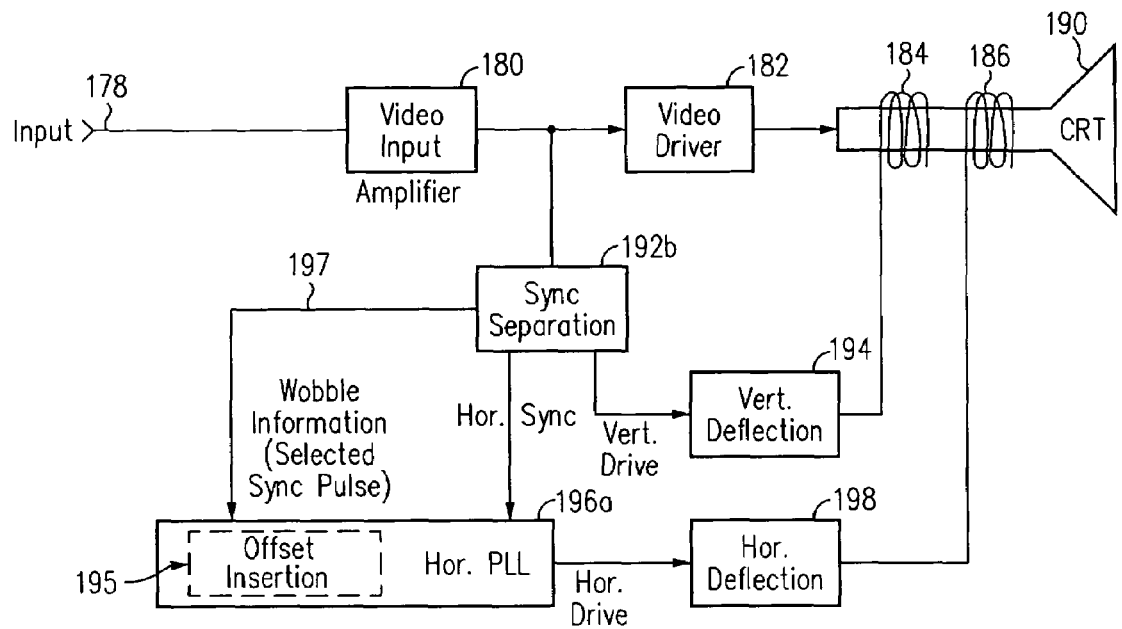
FIG. 11C shows a compliant HDTV set without the stealth interface.

FIG. 11C shows a variation of the FIG. 11B compliant HDTV set in most respects identical to that of FIG. 11B, but not including the stealth interface. In this case there is a modified version of the sync separator 192b which has the capability of not only outputting the conventional H, V signals but also, on a third line 197, outputting the wobble information extracted from the selected sync pulse using the technique shown in FIG. 4A.

Of course these are merely examples of compliant HDTV sets.

Defeat of HDPK

The following are six overall approaches to record (defeat) HDTV signals having the above described analog HDPK process: (a) modify the HDTV signal so the complete horizontal and vertical or horizontal or vertical sync waveform (i.e., all of the sync pulses) is recorded, (b) modify the signal so only the relevant selected sync horizontal pulse, which carries the wobble information, is recorded, (c) modify the horizontal sync signal so only the wobbling edge of the sync signal is recorded, (d) send the wobble information on the video data channel (as part of the video), (e) send the wobble information on an external data channel (separate line)—e.g., RGB and separates line, and (f) decode immediately and record directly using an external decoder.

Variations and combinations of these methods will be apparent to one skilled in the art. It is to be understood that record here refers to making a video recording that when played back provides a viewable picture, with little or not scrambling.

Figure 12A:
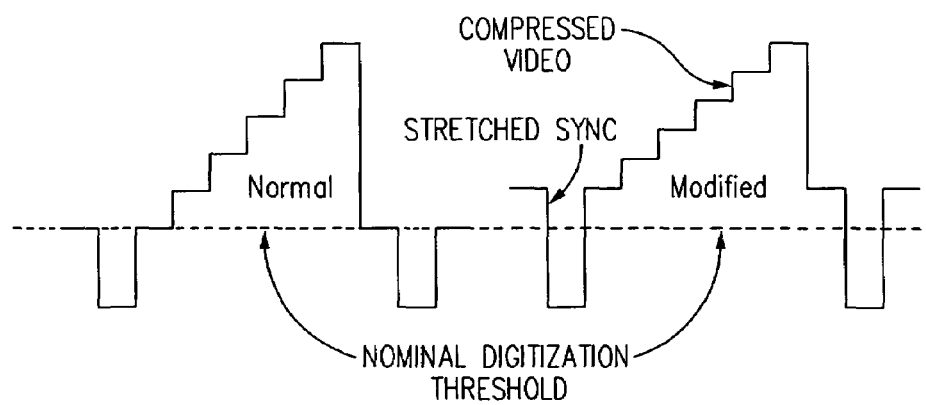
FIG. 12A shows a dynamic range HDPK defeat technique.

The following are various more specific ways to carry out these approaches:

One method is to shift the dynamic range of the entire video signal so the zero-crossing of the pertinent sync pulse is digitized by a conventional analog to digital converter at the nominal digitization threshold (see FIG. 12A waveforms). The left side of FIG. 12A shows a normal HDPK video line; the right side shows the modified waveform with the vertically stretched sync pulses and vertically compressed active video, with the stretched sync pulses extending across the nominal digitization threshold. It is assumed here generally that the relevant video recorders do not record the horizontal or vertical blanking intervals or their sync pulses so as to conserve bandwidth, and hence do not record anything below the nominal digitization level. Note that the sync pulse amplitude must be stretched accordingly so the recorder can separate it normally—that is, the sync pulse tips must still extend down to a level equivalent to—40 IRE (in NTSC). If the active video amplitude was not compressed, then the limited dynamic range of the video recorder causes it undesirably to clip off the white (active video). This compression/stretching can be accomplished by two-slope (non-linear) gamma correction such that one constant gain value is applied to the sync pulses and a second, constant but lesser gain value is applied to the active video, thereby avoiding any gamma distortion of the active video.

Figure 12B:
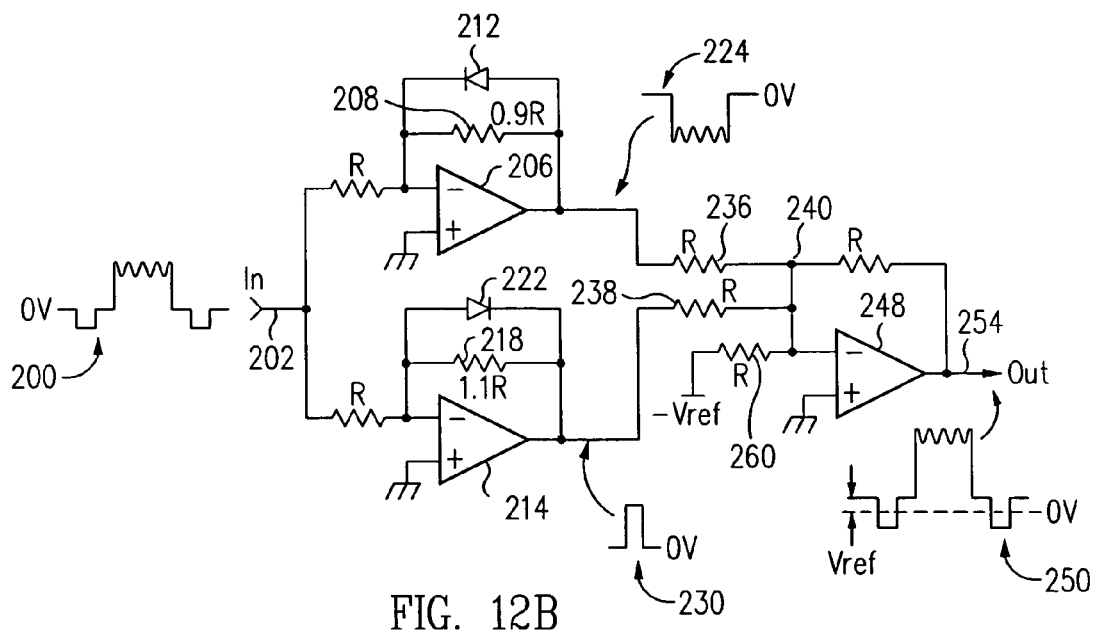
FIG. 12B shows a corresponding circuit.

FIG. 12B shows a circuit to carry out the defeat process illustrated by the waveforms of FIG. 12A. The FIG. 12B circuit would be connected between the source device such as a set top box and a video recorder. The input video signal 200, which is the same as the normal HDPK waveform shown in the left hand portion of FIG. 12A, is input at terminal 202. The signal input at terminal 202 then flows through both the upper portion and the lower portion of the circuit, which are similar. The upper portion includes operational amplifier 206 to which is connected in parallel a resistor 208 having a value of 0.9 R (where R is some selected resistance in ohms) and a diode 212. In the lower portion, there is an identical operational amplifier 214 connected in parallel to a resistor 218 having a value of 1.1 R and a diode 222 connected in the opposite direction to diode 212.

The upper part of the circuit including elements 212, 208, and 206, due to the way the diode 212 is connected, will only swing negative and hence amplifies the active video, with a 90% gain due to the 0.9 R value of resistor 208. Thus the intermediate waveform 224 shows the inverted active video.

The lower components 222, 218 and 214 positively amplify (by 110%) the negative going portion of the waveform which, of course, is the sync pulse and inverts this as shown by waveform 230. These lower components are connected so that they only swing positive. Resistors 236 and 238 connected to summing node 240 provide a summation using operational amplifier 248 of the amplified active video and amplified sync pulse, both of which are inverted by operational amplifier 248 to provide the output waveform 250 at terminal 254. Waveform 250 is identical to that in the right hand side of FIG. 12A. Note the use of the offset voltage-$V_{REF}$ apply to resistor 260. This provides a DC offset so that the top of the sync pulses is at the recorded level, that is, above the digitization threshold shown in FIG. 12A. Thus, the sync pulses exceed 0 volts so they are recorded by a typical digital video recorder.

Figure 12C:
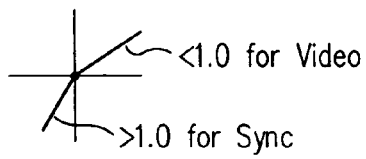
FIG. 12C shows the corresponding transfer function.

FIG. 12C shows graphically the transfer function for the FIG. 12B circuit with a slope of less than 1 for the active video (in the positive voltage range) and greater than 1 for the sync pulse (in the below zero voltage range). This is what is referred to above as the non-linear gamma connection.

Figure 12D:
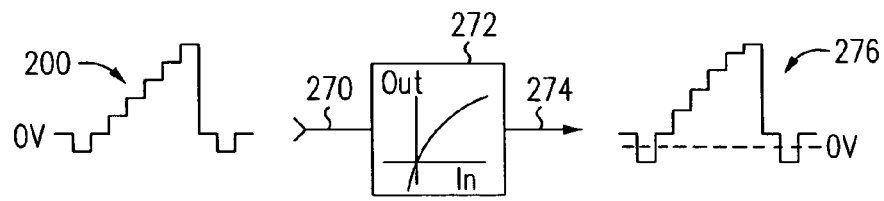
FIG. 12D shows a related defeat technique.

Alternatively, a continuous gamma correction would work, given the resultant gray-scale distortion induced by the correction's non-linear transfer function. FIG. 12D shows a waveform 200 essentially the same as waveform 200 in FIG. 12B (and the left most waveform in FIG. 12A) as the input signal applied to the input terminal 270 of a continuous gamma correction circuit 272 having the illustrated curved transfer function. The output signal 276 on terminal 274 is the modified video signal which, in most respects, is similar to that of waveform 250 in FIG. 12B except that the gamma correction is continuous rather than discontinuous. This is shown by the compression in the upper portion of waveform signal 276 in the active video. Thus, waveform 276 illustrates the disadvantage of this approach in that it alters the gray scale and one loses the desired linearity.

Figure 12E:
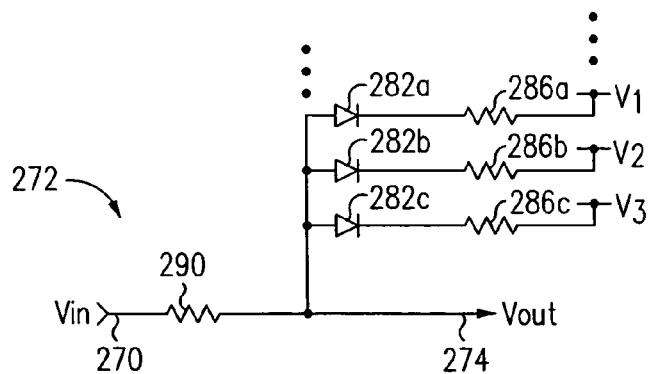
FIG. 12E shows the corresponding circuit.

FIG. 12E shows schematically circuit 272 of FIG. 12D including input terminal 270 and output terminal 274. Note that the FIG. 12E circuit is much simpler than that of FIG. 12B, and includes a network of resistors 282a, 282b, 282c each having an associated resistor 286a, 286b, 286c each of which has a respective voltage applied to it, $V_1$, $V_2$, $V_3$. The number of stages is determined by the number of correction factors to be applied. In extreme case, one would need only two stages each with its own applied voltage. This would provide a two gamma correction similar to the circuit of FIG. 12B. The values of the resistors 286a-286c are scaled with respect to the value of the input resistor 290 as understood by one of ordinary skill in the art, to obtain the desired transfer function 272.

In order to defeat HDPK using the circuit of, for instance, FIG. 12B or FIG. 12E, one connects the circuit between the output terminal of the source (such as a set top box) and the video input terminal of the video recorder. Generally, such a circuit is provided for each of the component video channels. This causes recording of the modified HDPK video signal as shown in the right hand portion of FIG. 12A and also in FIG. 12B as waveform 250.

It is to be understood that the recorder used for this recording is a digital video recorder which has the capability of recording the blanking intervals but generally does not record signals below its digitization threshold. Note that it is not known if such video recorders are now commercially available but it is expected that they may be available soon. If digital video recorders are of the type which does not record blanking intervals, which may be the case, the FIG. 12B or FIG. 12E approach would not be operative.

In terms of playback of the recorded signal, post-processing is necessary. The conventional video recorder plays the recorded video signal 250. This playback signal is input to a playback "black box" device which is effectively the inverse of the FIG. 12B circuit in that it accepts the waveform 250 and converts that back into a waveform 200. This waveform 200 is then input into a compliant display device, e.g., a high definition TV set which is compliant with HDPK which then will successfully play the signal. Note that a non-compliant HDPK TV set will not successfully play the signal but instead will merely show a scrambled picture. Hence, for successfully recording and playback, one requires a recording black box circuit of the type shown in FIG. 12B or FIG. 12E together with a digital recorder capable of recording the blanking intervals and a playback black box, coupled to an HDPK compliant TV set.

Figure 13A:
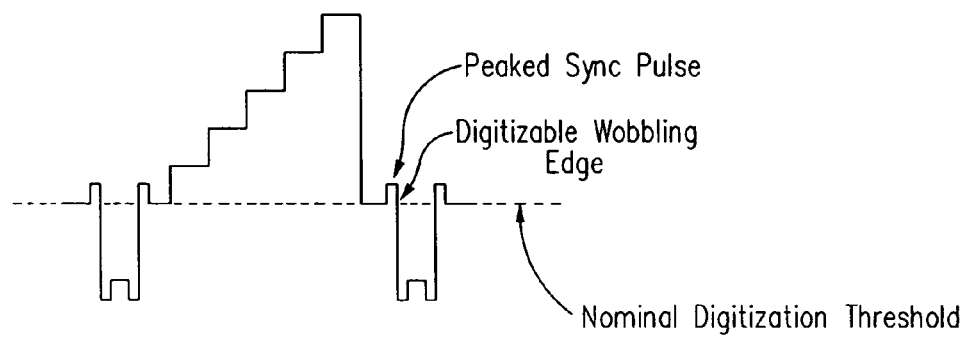
FIG. 13A shows a sync peaking HDPK defeat technique.

Another defeat method is to emphasize (peak) the sync pulses (only) of the video signal so the pulse edge extends further (see FIG. 13A waveform). Note the "peaked" sync pulse with the peaked edges extending just above the digitization threshold. FIG. 13A shows how the peak sync pulse edges extend just above the digitization threshold and hence would be recorded by the above described video recorder having capability to record signals in the blanking interval that extend above the digitization threshold. FIG. 13A shows the HDPK signal as modified by a suitable black box defeat circuit from the input HDPK video signal.

Figure 13B:
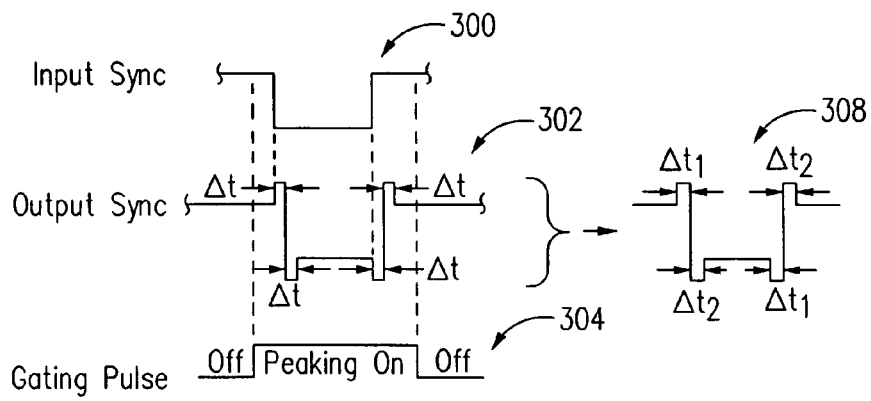
FIG. 13B shows corresponding sync pulse waveforms.

FIG. 13B shows detail of the modifications to the sync pulse. The upper waveform 300 in FIG. 13B is the input sync pulse without the peaking. The next waveform 302 shows the output sync pulse having various peaks each having a time duration of Δt. In this case, each edge is peaked. The gating pulse, which is the control pulse which accomplishes this, is shown as waveform 304 in FIG. 13B having a duration slightly longer than that of the sync pulse 300 during which the peaking function occurs. This combination results in the waveform 308 shown in the right hand portion of FIG. 13B where the duration of the peaking is $\Delta t_1$, and $\Delta t_2$ as shown. The gating pulse 304 is generated by conventional logic circuitry in the black box (not shown) which thereby controls where the peaking occurs. The peaking may be all of the video, all of the sync pulse (as shown in FIG. 13B) or only at the sync pulse edges, or only a selected sync pulse edge.

Figure 13C:
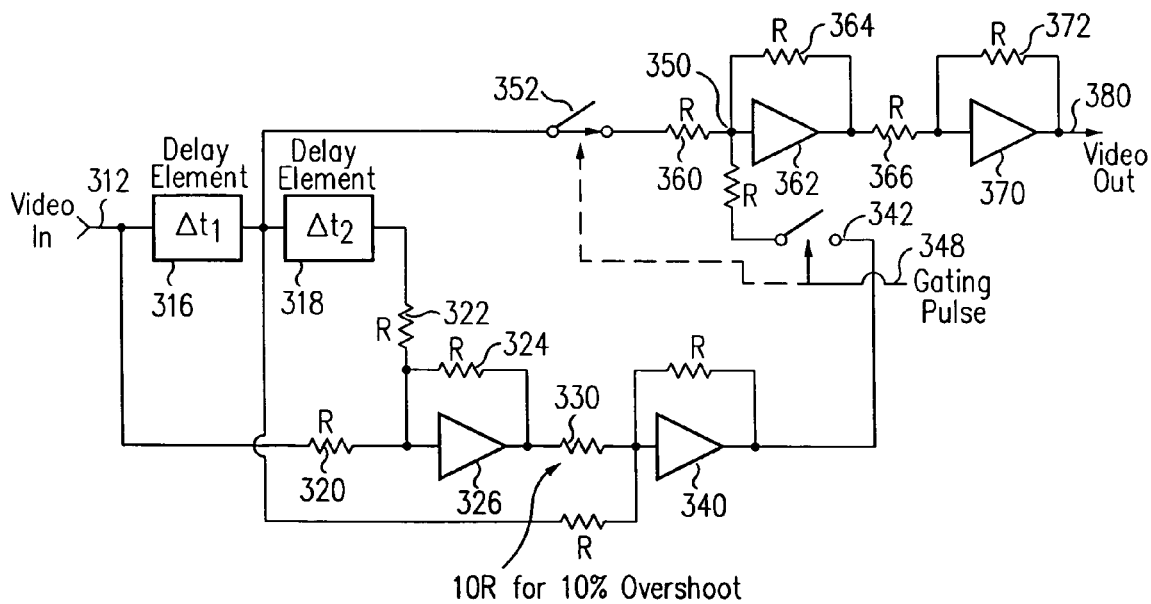
FIG. 13C shows a corresponding circuit.

A circuit to accomplish this is shown in FIG. 13C where the input video which is the unmodified HDPK signal is applied at terminal 312 to a first delay element 316 and hence to a second delay element 318. The delay duration of these delay elements is $\Delta t_1$ and $\Delta t_2$ as shown in waveform 308 in FIG. 13B. The resulting signal from delay element 318 as applied via resistors 320, 322, 324 and amplifier 326 to resistor 330 which, as shown, has a value of 10 R or ten times the resistance of each of resistors 320, 322 and 324 to accomplish the desired 10% overshoot (10% peaking factor). The embodiment shown here is phase linear but that need not be the case.

The resulting signal is then inverted by inverting amplifier 340 and applied via switch 342 to the summing node 350. Switch 342 is operated by the gating pulse 304 applied to terminal 348. Gating pulse 304 is also applied to control a second switch 352 which controls the video in the upper portion of the circuit. The polarity of switches 348 and 352 is opposite so that when one switch is open, the other is closed. The output signal from switch 352 is applied via resistor 360 to the summing amplifier 362 with its associated resistor 364. Then, via resistor 366, the resulting signal is inverted by the combination of amplifier 370 and resistor 372 to the output terminal 380.

Note that in waveform 308, $\Delta t_1$ is equal to $\Delta t_2$ is equal to $\Delta t$. However, there is no requirement that $\Delta t_1 = \Delta t_2$; the amounts of peaking could be different. For leading edge peaking only, one would shorten the gating pulse 304 accordingly to only the duration of the leading edge. Moreover for a "pre-shoot" only peaking, that is a non-linear phase, one could delete the $\Delta t_2$ delay element 318 and the associated summing resistor 322.

Figure 14:
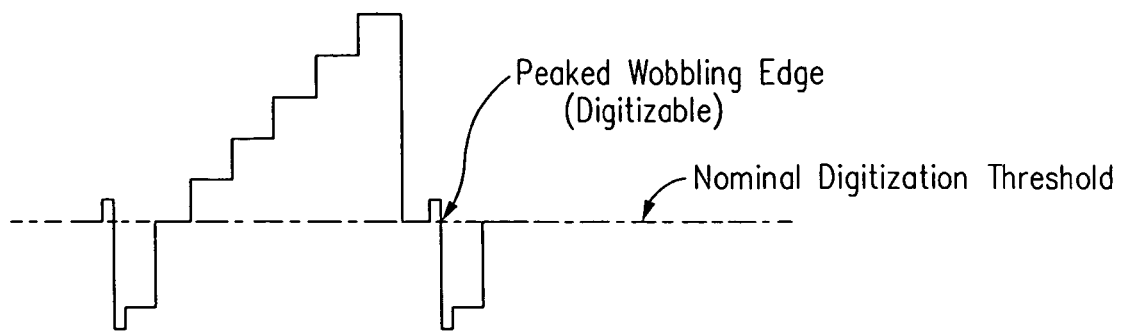
FIG. 14 shows an alternative to the FIG. 13A technique.

Alternatively, one may peak just the wobbling edge (the edge carrying the encoded wobble information) as in FIG. 14, or further, peak the entire waveform. The FIG. 13C circuit is capable of doing this as described above.

Figure 15A:
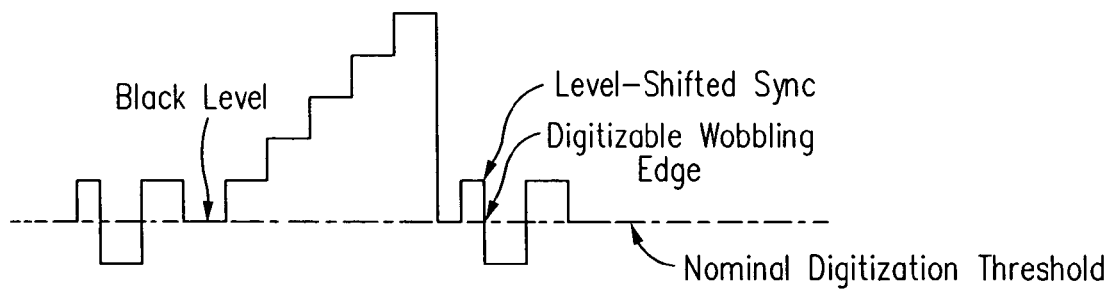
FIG. 15A shows a level shift HDPK defeat technique.
Figure 15B:
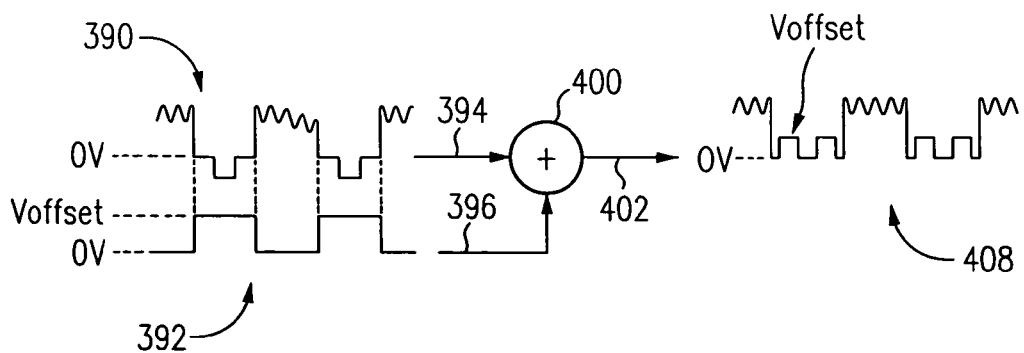
FIG. 15B shows a corresponding circuit.

Another defeat method is to level shift just the sync pulses (as in sync suppression) above the black level so the wobbling pulse edge is digitized by extending it beyond the nominal digitization threshold (see FIG. 15A waveform). FIG. 15B shows a circuit to accomplish the FIG. 15A level shifting. The left part of FIG. 15B shows the input waveform, that is the non-modified HDPK waveform 390, as being active video plus horizontal sync pulses. The lower portion of the left hand portion of FIG. 14B shows the offset or level shifting input signal waveform 392. This level shifting signal is somewhat narrower than the equivalent horizontal blanking interval but somewhat wider than the horizontal sync pulse in that blanking interval as shown. These two waveforms are input into respectively terminals 394 and 396 coupled to a summer 400 of the type shown above to yield at the output terminal 402 a waveform 408 similar to that shown in FIG. 15A although with the active video shown slightly differently. Thus this circuit effectively strips off the original sync signal and generates a new signal narrower than the blanking interval and wider than the sync pulse and adds it in linearly to the active video so as to push up the level of the sync pulses so that they are recorded as being above the digitization threshold shown in FIG. 15A.

Figure 16A:
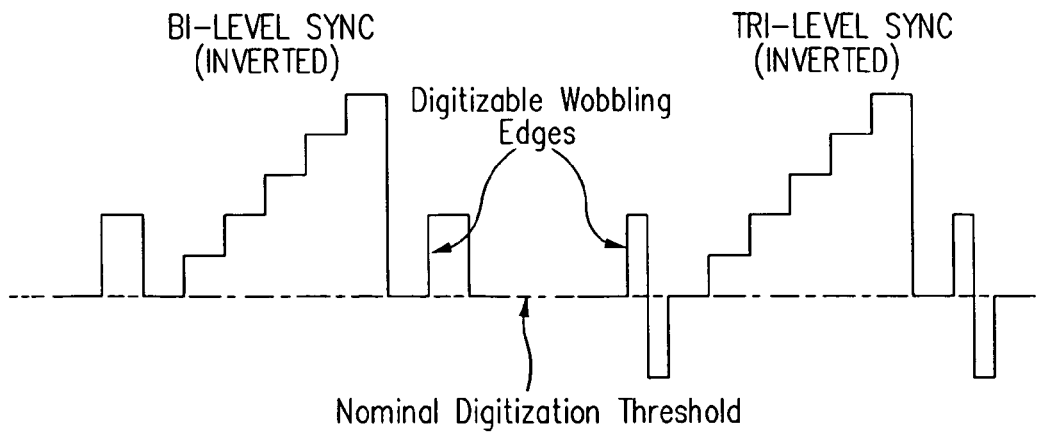
FIG. 16A shows an invented sync HDPK defeat technique.

Another defeat method is to invert the sync pulses above the digitization threshold so the wobbling edge is digitized (see FIG. 16A waveform). The left hand portion of FIG. 16A shows this process applied where the HDPK has a bi-level sync pulse which is inverted and the right hand portion of FIG. 16A shows the modified HDPK with a tri-level sync pulse inverted. Thus this method is applicable to HDTV signals having both types of sync pulses. This method may require circuitry modifications to the video recorder in order to properly separate and process the resulting inverted sync pulses. This method, like the others here, renders the sync pulses recordable by putting them into the recordable (digitizable) range of the recorder, so they are recorded like normal active video. Note that the FIG. 16A method also does not work unless the video recorder records the blanking intervals.

Figure 16B:
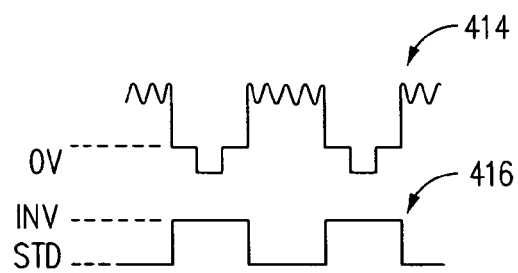
FIG. 16B shows corresponding sync pulse waveforms.

The input waveforms to accomplish this are shown in FIG. 16B where waveform 414 is the unmodified HDPK signal having normal negative going sync pulses and waveform 416 is the inverting or control signal, similar to signal 392 in FIG. 15B. These signals are respectively applied to the input terminal 420 in FIG. 16C of the corresponding circuit. That is, signal 414 is applied to terminal 420. Signal 414 is coupled to resistor 424 and then inverted by the inverter including amplifier 426 and resistor 428. The control signal 416 is applied to the control terminal of switch 430 to provide output waveform 438 at output terminal 432.

Note that output waveform 438 is similar to the output signal shown in FIG. 16A. That is it has the inverted sync pulses.

Figure 16C:
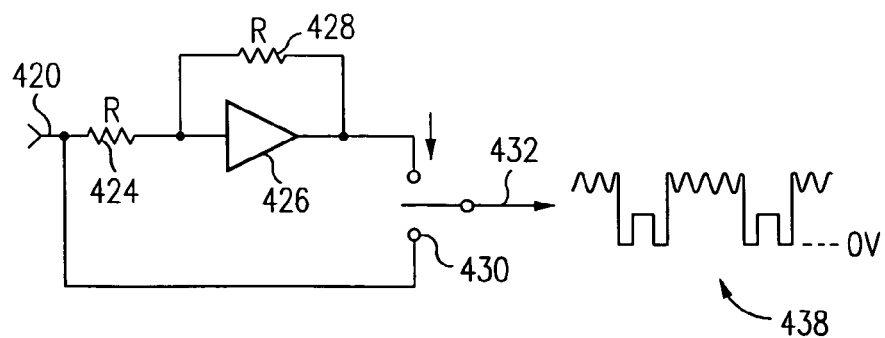
FIG. 16C shows a corresponding circuit.

As can be seen, this sync inversion is readily accomplished by the FIG. 16C circuit by simply inverting the video signal only during those times when the sync pulse is present. Of course it is easy to determine this since the sync pulses are readily separated out from the incoming video signal. The nature of the control waveform 416 may vary. One only needs to invert the sync pulse which contains the wobble data, which only occurs once per field. Given knowledge of the location of this particular selected sync pulse as described above being in the second line of the vertical blanking interval, generation of the waveform 416 is routine. Of course, one could merely invert each sync pulse throughout the video signal if desired. Similar considerations apply to the FIG. 15B circuit as regards the control signal.

It is be reiterated that the various defeat circuits and the associated methods disclosed up to this point require a video recorder that records the blanking intervals and that such digital video recorders are not yet believed to be commercially available. However, these digital video recorders by definition do not have the capability to record below their digitization threshold; if they did, these defeat circuits would not be necessary.

Figure 17A:
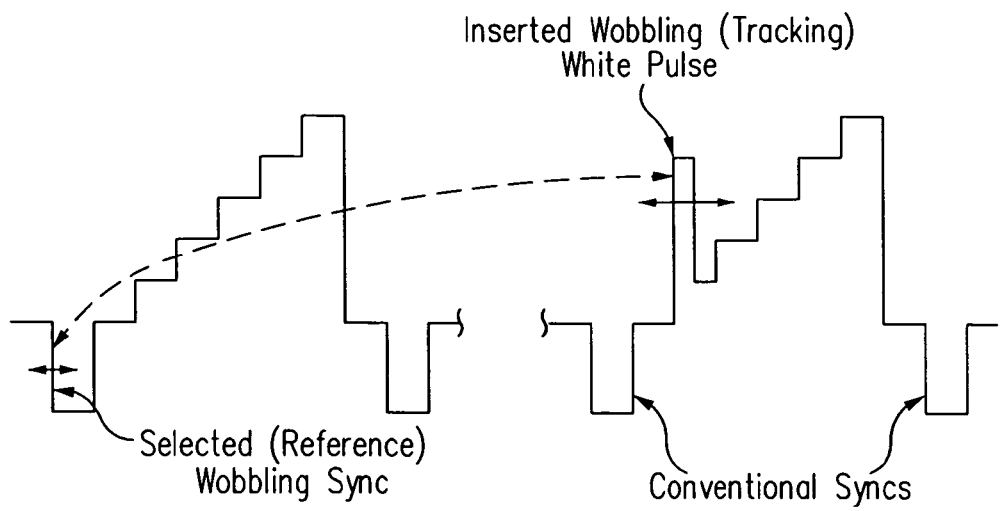
FIG. 17A shows a wobbled white pulse HDPK defeat technique.

Another defeat method is to add a white pulse, indicating the amount of wobble by its location in time, somewhere in the recordable video region. (The height of the white pulse alternatively could indicate the amount of wobble.) One implementation is to locate the added white pulse at the left edge of the first line of active video (video line 22), in each field/frame, but other locations may be used instead (see FIG. 17A). In FIG. 17A, the incoming HDPK signal is shown (left side) with the selected reference wobbling sync signal. The right hand portion of FIG. 17A shows the video signal after it is modified in accordance with this process so that, substituted for the selected wobbling sync signal, is a wobbling (tracking) white pulse. The remaining sync signals are in their proper location and do not wobble. The location, in terms of time, of this wobbling white pulse exactly tracks the wobbling edge of the wobbling sync pulse in the left hand portion of FIG. 17A. This white pulse method uses the fact that all recorders record active video, but has the drawback that the added white pulse will appear as a bright spot in the picture.

The FIG. 17A approach has the advantage that it does not require a recorder capable of recording blanking intervals. Current (non-HDTV) digital video recorders, in fact, do not record blanking intervals and it is expected that this will remain the case.

Figure 17B:
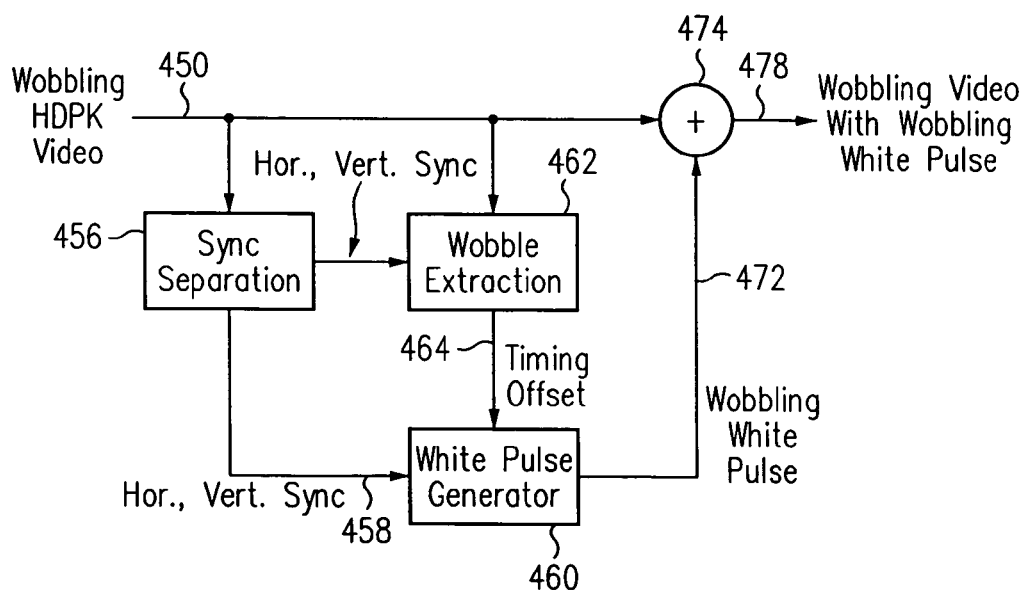
FIG. 17B shows a corresponding circuit.

The FIG. 17A method is carried out in one embodiment by the "black box" circuit of FIG. 17B. The incoming unmodified HDPK video signal, as shown in the left hand portion of FIG. 17A, is applied to input terminal 450. This video signal is then coupled to a sync separator 456. Sync separator 456 performs the conventional horizontal and vertical sync separation. The separated H, V sync pulses, on line 458, are coupled to a white pulse generator 460 which produces the actual white pulse. Of course it remains to be determined the exact location (in terms of time) of this white pulse which must track the input wobbling sync pulse as shown in FIG. 17A.

This is accomplished by the central portion of the FIG. 17B circuit which extracts the wobble data at circuit 462 and from it generates a timing offset value on line 464 that reflects the amount of the wobble and is applied to the white pulse generator 460. The input HDPK video is then summed with the wobbling white pulse provided on line 472 at summer 474 to be output on terminal 478 as the wobbling video, with the wobbling white pulse shown in the right hand portion of FIG. 17A. Of course this white pulse location in video line 22 is arbitrary.

Figure 17C:
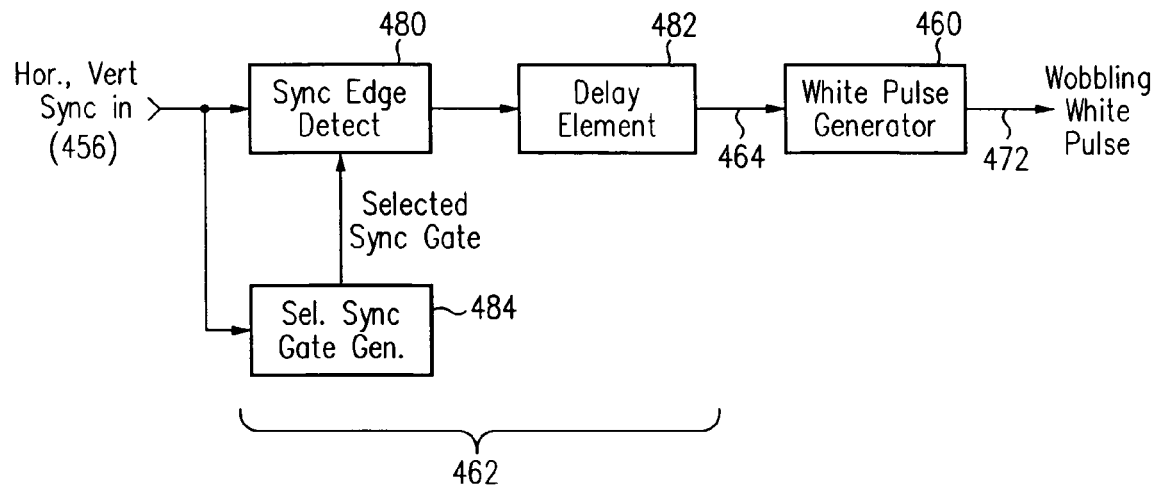
FIG. 17C shows detail of the FIG. 17B circuit.

Detail of wobble extraction circuit 462 is shown in FIG. 17C, having a selected sync pulse gate generator 484 controlling a sync pulse edge detector 480, to extract the timing signal and delay the timing offset through delay element 482 before inputting it into the white pulse generator 460.

Another defeat method is to modulate the wobble information onto an audio carrier signal and input it to one of the video recorder's audio channels. Possible modulation modes include PSK (phase shift keying) and slow-speed PCM (pulse code modulation). Note that the audio channel need only carry about 8 bits for each field/frame to indicate the amount of wobble, so the data rate is only about 500 bits/second.

Figure 18:
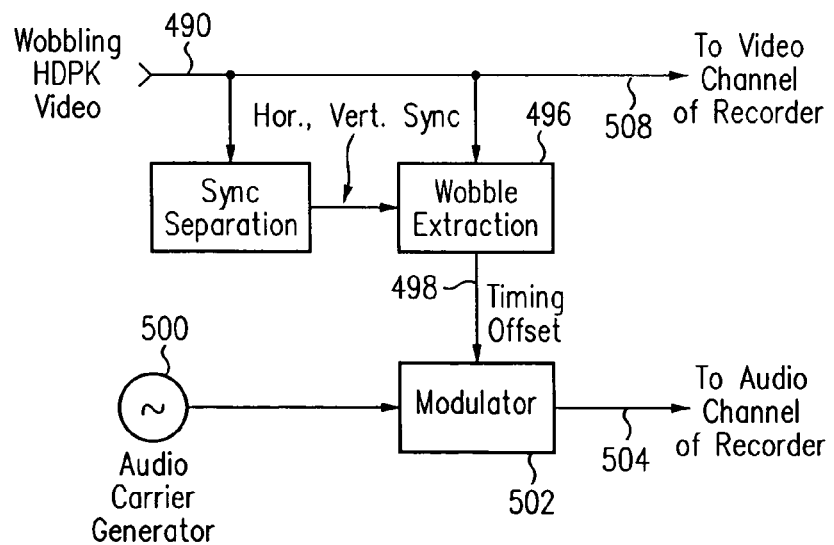
FIG. 18 shows a circuit for an audio carrier HDPK defeat technique.

A circuit to accomplish this is shown in FIG. 18. The input HDPK video signal is applied to input terminal 490. The wobble data is extracted, using sync separator 456 (same as in FIG. 17B) from the wobbling data signal by circuit 462 (same as in FIG. 17B), and is then output as a timing offset signal on line 464. Separately, an audio frequency carrier signal is generated conventionally by generator 500 and applied to one input terminal of modulator 502. The timing offset signal on line 464 is applied to the other input terminal of modulator 502 which outputs on its output terminal 504 the wobble information in the audio carrier signal, which is applied to the audio channel of the video recorder. The HDPK video signal is passed through to the video channel of the video recorder at terminal 508.

The FIG. 18 circuit, like that of FIG. 17B, allows recording, using a digital recorder which does not record blanking intervals at all, of the HDPK scrambled signal. Of course, as in the other defeat techniques on the occasion of playing back the recorded HDPK, a playback black box is required which allows reconstruction of the recorded modified HDPK signal to its original HDPK form, which is then coupled to a compliant HDTV set for viewing.

Another defeat method is to digitize the offset (wobble) information and code it conventionally as vertical blanking interval data, either as an 8-bit (nominal) data burst or even at one bit per video line. The data burst could be put into the first line of active video; alternatively the eight individual bits could, for instance, be inserted one per line into the first eight lines of active video. In this case it would be advantageous to delay the corresponding video wobble by one field/frame in order to provide time to receive all eight bits while still applying the resultant wobble offset to the first line of the appropriate field/frame.

Figure 19:
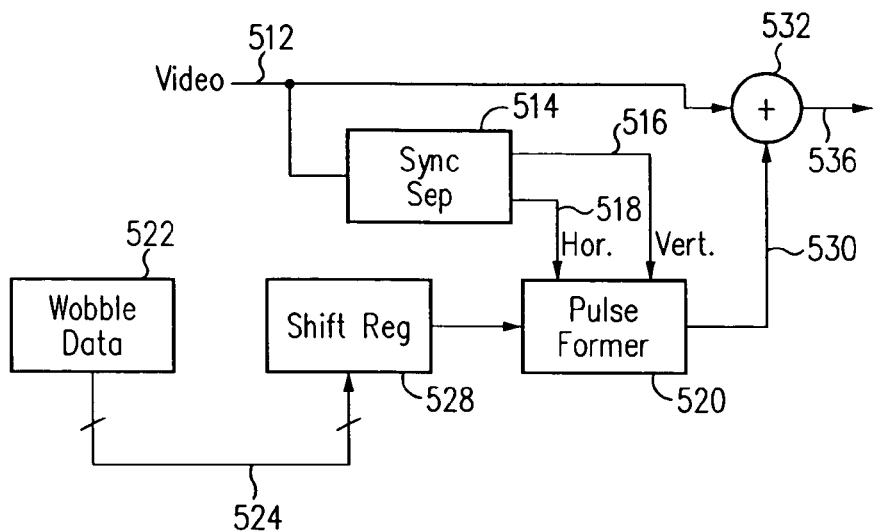
FIG. 19 shows a circuit for a digitized VBI data HDPK defeat technique.

This digitizing of the offset information is accomplished by a circuit of the type shown in FIG. 19 where the input video signal, which is the HDPK scrambled video, is applied to input terminal 512 and hence to conventional sync separator 514 which outputs respectively, on lines 516 and 518, the vertical and horizontal sync signals to a pulse former circuit 520. At the same time the wobble data, which has been extracted from the input video by circuit 522 and put in digital form, is coupled, via bus 524, to a shift register 528. The extracted wobble data is thus digitized by the wobble data digitizer 522 and shift register 528 and then formed into a serial pulse train by pulse former 520. The serial pulse train is inserted into the proper portion of one of the blanking intervals. This blanking interval signal is then provided on line 530 and summed with the input video signal from terminal 512 by summer 532 to provide the modified HDPK video signal on output terminal 536. This digitized signal could be any one of a number of forms. Typically it would be a train of pulses forming an analog waveform in one of the vertical blanking interval lines, similar to close captioned data in video.

Another defeat method is to wobble all the sync pulses, thereby generating a conventional decoded PK signal (see the above-referenced Macrovision patents pertaining to PhaseKrypt) and then record the result directly (i.e., insert a standalone conventional PK decoder between the video source and the recorder), with or without subsequent time-base correction to remove the wobble. Note that time-base correction would only be required when the associated video recorder does not have adequate internal time-base compliance to track the decoded PhaseKrypt signal. This method is somewhat different from those described above in that it does not require an HDPK compliant display device to display the recorded video. Instead, this method descrambles the video prior to recording. Hence this is a more powerful method.

Figure 20:
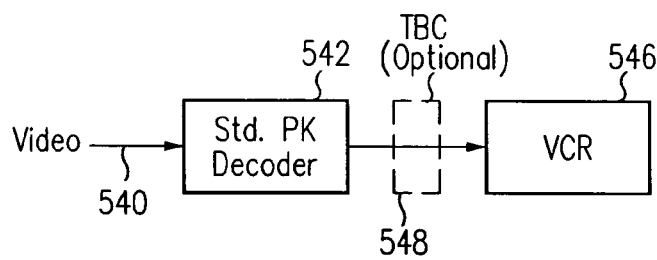
FIG. 20 shows an arrangement to defeat HDPK using a decoder.

This method is illustrated by the circuit of FIG. 20 in which the HDPK scrambled video is applied to the input terminal 540 of a PhaseKrypt (PK) decoder 542. Decoder 542 is essentially a standard PhaseKrypt decoder of the type known in the art (see above) which strips off the sync signal, extracts the wobble information, and synthesizes a wobbling sync signal. This wobbling sync signal matches the video wobble exactly and so one has a coherent signal with a time base error. This signal, however, is generally recordable by a typical recorder such as a VCR 546 and thus the recorded signal is playable by a non-compliant television set. Note the use of (optionally) a time base corrector 548 coupled between the PhaseKrypt decoder 542 and the recorder 546. This is only done if the VCR 546 needs it in order to overcome the time base error present in its input signal. Thus, this method is essentially conventional (PhaseKrypt) descrambling prior to recording.

The last defeat method is to dewobble the input video signal and then record it, i.e., connect a modified time base corrector circuit between the source and the recorder to quantize the wobble in the time domain. Note that it is not necessary to digitize the video to do this—e.g., an analog "bucket brigade" circuit would also work, accomplished with, e.g., either a monolithic CCD structure or cascaded individual sample/holds. While the FIG. 20 method involves manipulating of the sync signal, this method manipulates the video signal.

Figure 21:
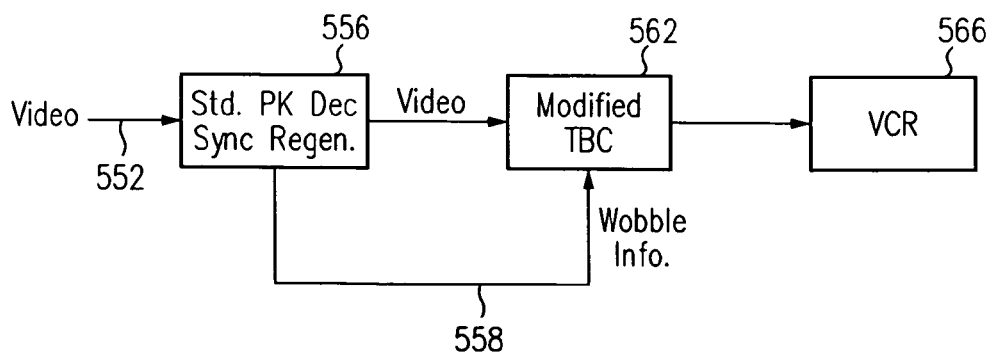
FIG. 21 shows an arrangement to defeat HDPK using time base correction.

As shown in FIG. 21, in this method the input HDPK video is applied to terminal 552 and thence to a conventional PhaseKrypt decoder 556 with sync regeneration. The regenerated sync pulses on line 558 are then applied to a modified time base corrector 562 where the sync pulses on line 558 carry the wobble information. The modified time base corrector 562, which is essentially a conventional time base corrector, does remove the wobble so that one has a totally standard video signal which can then be recorded by any conventional video recorder 566. Again, the FIG. 20 and FIG. 21 approaches do not require an HDPK compliant display device to display the signal recorded by the video recorder, unlike the other defeat techniques disclosed here which require a compliant display device as well as a playback black box to convert the modified HDPK signal back into the expected HDPK signal acceptable by the display device.

This disclosure is illustrative and not limiting; further modifications will be apparent to one skilled in the art in light of this disclosure and are intended to fall within the scope of the appended claims.

We claim:

1. A method for scrambling a high definition television (HDTV) signal, comprising the acts of:
providing the HDTV signal;
time shifting the active picture portion of scan lines of the HDTV signal relative to the line timing reference of each scan line; and
inserting into the HDTV signal an indication of the amount of the time shifting;
wherein a maximum amount of the time shifting is predetermined and is included in the HDTV signal in such a manner as not to be recordable by at least some video recorders.

2. The method of claim 1, wherein the amount of the time shifting of each scan line is constant for all scan lines of a particular frame or field of the HDTV signal.

3. The method of claim 1, wherein the line timing reference is a color burst or a synchronization pulse.

4. The method of claim 1, further comprising the act of encoding the indication of the amount of time shifting into data of predetermined length.

5. The method of claim 1, wherein the inserting includes inserting the indication of the amount of time shifting into a blanking interval of the HDTV signal.

6. The method of claim 5, wherein the indication is modulation in time of a predetermined synchronization pulse in a preceding field or frame of the HDTV signal.

7. The method of claim 6, further comprising the act of suppressing a pedestal level of the predetermined synchronization pulse.

8. The method of claim 6, wherein the indication is modulation in time of a predetermined edge of the predetermined synchronization pulse.

9. The method of claim 1, further comprising the act of varying the amount of the time shifting in each field or frame.

10. The method of claim 9, wherein the variation is random or pseudo random.

11. The method of claim 1, further comprising the acts of:
converting the provided HDTV signal to digital component format, prior to the time shifting;
time shifting each of the digital components; and converting the time shifted components to an analog HDTV signal.

12. A method of descrambling a scrambled high definition television (HDTV) signal, the scrambled HDTV signal having, in its active picture portion, video lines time shifted relative to the line timing reference of each video line, and having an indication of the amount of the time shifting associated with the HDTV signal in such a manner as not to be recordable by at least some video recorders, the descrambling comprising the acts of:
receiving the scrambled HDTV signal;
extracting from the scrambled HDTV signal the indication of the amount of time shifting;
generating a new line timing reference; and
establishing a stable relationship between the generated line timing reference and the active picture portion of the video lines, using the extracted indication of the time shifting.

13. The method of claim 12, wherein the amount of the time shifting of each video line is constant for a particular frame or field of the HDTV signal.

14. The method of claim 12, wherein the line timing reference is a color burst or a synchronization signal.

15. The method of claim 12, wherein the indication of the amount of time shifting is encoded into data of predetermined length.

16. The method of claim 12, wherein the indication of the amount of time shifting is inserted into a blanking interval of the HDTV signal.

17. The method of claim 12, wherein the indication is in a predetermined synchronization pulse in each of a preceding field or frame of the HDTV signal.

18. The method of claim 17, wherein a pedestal level of the predetermined synchronization pulse is suppressed.

19. The method of claim 17, wherein the indication is a location of a predetermined edge of the predetermined synchronization pulse.

20. A high definition television (HDTV) receiver adapted to descramble a scrambled HDTV signal, comprising:
an input terminal for receiving the HDTV signal;
a separator circuit coupled to the input terminal and which extracts from the HDTV signal indications of time shifting of the active picture portion of video lines of the HDTV signal relative to the line timing reference of each line;
a phase lock loop coupled to the separator circuit, which generates a new line timing reference and establishes a stable relationship between the generated line timing reference and the active picture portion of the video lines using the extracted indications; and
a deflection circuit having an input terminal coupled to the phase lock loop and having an output terminal coupled to drive a television display.

21. The apparatus of claim 20, wherein the amount of the time shifting of each video line is constant for a particular frame or field of the HDTV signal.

22. The apparatus of claim 20, wherein the line timing reference is a color burst or synchronization signal.

23. The apparatus of claim 20, wherein each indication of the amount of time shifting is encoded into data of predetermined length.

24. The apparatus of claim 20, wherein each indication of the amount of time shifting is in a blanking interval of the HDTV signal.

25. The apparatus of claim 24, wherein each indication of the amount of the time shifting is in a predetermined synchronization pulse in a preceding field or frame of the HDTV signal.

26. The apparatus of claim 25, wherein a pedestal level of the predetermined synchronization pulse is suppressed.

27. The apparatus of claim 25, wherein the indication is a location of a predetermined edge of the predetermined synchronization pulse.

28. The apparatus of claim 20, wherein the separator circuit is coupled between the input terminal for receiving the HDTV signals and a video amplifier coupled to drive the television display.

29. The apparatus of claim 20, further comprising a video amplifier coupled between the input terminal for receiving the HDTV signal and the separator circuit.

30. An apparatus for scrambling a high definition television (HDTV) signal, comprising:
an input terminal for receiving the HDTV signal;
a source of a time varying signal;
a storage coupled to the source of the varying signal and coupled to the input terminal, which time shifts the active portion of video lines of the HDTV signal by an amount determined by the varying signal, relative to the line timing reference of each video line;

a switch coupled to the storage and to the source of the time varying signal, thereby to insert into the HDTV signal an indication of the amount of the time shifting in such a manner as not to be recordable by at least some video recorders; and an output terminal coupled to the switch and which outputs the time shifted HDTV signal with the inserted indication.

31. The apparatus of claim 30, wherein the amount of the time shifting of each video line is constant for a particular frame or field of the HDTV signal.

32. The apparatus of claim 30, wherein the line timing reference is a color burst or a synchronization pulse.

33. The apparatus of claim 30, wherein the indication of the amount of time shifting is encoded into data of predetermined length.

34. The apparatus of claim 30, wherein the indication of the amount of time shifting is inserted into a blanking interval of the HDTV signal.

35. The apparatus of claim 30, wherein the indication is inserted into a predetermined synchronization pulse in a preceding field or frame of the HDTV signal.

36. The apparatus of claim 35, wherein a pedestal level of the predetermined synchronization pulse is suppressed.

37. The apparatus of claim 35, wherein the indication is a location of a predetermined edge of the predetermined synchronization pulse.

38. The apparatus of claim 30, wherein the apparatus varies the amount of the time shifting in each field or frame.

39. The apparatus of claim 30, wherein the variation in the time varying signal is random or pseudo random.

40. The apparatus of claim 30, wherein the received HDTV signal is in digital form and the signal at the output terminal is in analog form.

41. The apparatus of claim 30, further comprising a pulse generator coupled between the switch and the source of the time varying signal, thereby to insert a representation of the time shifting into the blanking interval.

42. A method of coupling a scrambled high definition television (HDTV) signal between a source and an HDTV receiver, wherein a coded pulse for descrambling the HDTV signal is located at a predetermined portion of a blanking interval of the scrambled HDTV signal, comprising the acts of:

transmitting the HDTV signal in analog form from the source;

conveying the transmitted HDTV signal on a conductor to the receiver;

except when the predetermined portion of the HDTV signal is being conveyed, providing a standard video connection on the conductor between the source and the receiver; and when the predetermined portion is being conveyed, transmitting that portion of the HDTV signal as a current signal on the conductor.

43. The method of claim 42, further comprising clipping a voltage of the HDTV signal when the predetermined portion is being conveyed.

44. An output interface in a source of scrambled high definition television (HDTV) signal wherein a coded pulse for descrambling the HDTV signals is located at a predetermined portion of a blanking interval of the scrambled HDTV signal, the interface comprising:

an input terminal for receiving the scrambled HDTV signal;

an output terminal for connecting to a HDTV receiver; and an interface circuit coupled to a node between the input and output terminals and having a control terminal coupled to receive a control signal, wherein during the predetermined portion of the blanking interval, in response to the control signal, the interface circuit provides a current signal to the output terminal to be included in the scrambled HDTV signal to be output to the HDTV receiver on the output terminal.

45. An input interface in a high definition television (HDTV) receiver adapted for descrambling a received scrambled HDTV signal including a coded pulse located at a predetermined portion of the scrambled HDTV signal, the interface comprising:

an input terminal for connecting to a source of the scrambled HDTV signal;

an output terminal connected to display circuitry of the receiver; and an interface circuit coupled to a node between the input and output terminals and having a control terminal for receiving a control signal indicating the predetermined portion of the HDTV signal, wherein during the predetermined portion, in response to the control signal and an input current signal, the interface circuit provides a corresponding signal to the output terminal.

46. A method of modifying a high definition television (HDTV) signal which has been subject to time shifting of the active video in a video line relative to a timing reference of the line, wherein an indication of the amount of time shifting is associated with the HDTV signal and not recordable by at least some video recorders, for inhibiting the making of acceptable recordings of the HDTV signal therefrom, the method comprising the acts of:

receiving the HDTV signal including the associated indication of the amount of time shifting;

modifying the HDTV signal so that the indication of the amount of time shifting is recordable; and recording the HDTV signal along with the indication of the amount of time shifting, thereby to permit later playback of a more acceptable video recording of the HDTV signal.

47. The method of claim 46, wherein the act of modifying includes at least one of:

a) level shifting the indication;
b) level shifting at least a portion of the indication;
c) increasing an amplitude of at least a portion of the indication;
d) placing the indication in an above black level portion of the HDTV signal;
e) placing the indication in an active video portion of the HDTV signal;
f) placing the indication in an audio channel associated with the HDTV signal; and
g) encoding the indication and placing the encoded indication in a blanking interval of the HDTV signal.

48. The method of claim 46, wherein the act of modifying includes modifying the HDTV signal so that at least a portion of the HDTV signal carrying the indication is recordable.

49. The method of claim 46, wherein the act of modifying includes providing the indication in a recordable portion of the HDTV signal.

50. The method of claim 46, wherein the act of modifying includes:

extracting the indication from the HDTV signal; and
conveying the extracted indication in a channel not carrying a remainder of the HDTV signal.

51. The method of claim 46, wherein the act of recording includes converting the HDTV signal to digital form, and wherein the act of modifying includes changing an amplitude of at least a portion of the HDTV signal carrying the indication, prior to the converting, to a level at which the indication can be converted to the digital form.

52. The method of claim 51, further comprising changing an amplitude of an active picture portion of the HDTV signal.

53. The method of claim 51, wherein the indication is at an edge of a sync pulse in the HDTV signal, and the act of modifying includes changing an amplitude of at least the edge of the sync pulse.

54. The method of claim 46, wherein the act of recording includes converting the HDTV signal to digital form, and wherein the act of modifying includes moving a portion of the HDTV signal carrying the indication to a location in the HDTV signal, wherein the indication is a pulse train.

55. The method of claim 50, wherein the act of conveying includes modulating the indication onto an audio frequency carrier signal on an audio channel.

56. The method of claim 46, wherein the act of modifying includes:
   extracting the indication;
   coding the indication; and
   inserting the coded indication into a predetermined portion of the HDTV signal.

57. The method of claim 56, wherein the predetermined portion is one of active video or a blanking interval.

58. The method of claim 46, wherein the act of modifying includes:
   correcting time shifting between the active video and the timing reference in the video line, prior to the act of recording, thereby obviating the need to record the indication of the amount of time shifting.

59. The method of claim 58, further comprising correcting any time base error in the video line after the correcting of the time shifting.

60. An apparatus for modifying a high definition television (HDTV) signal which has been subject to time shifting of the active video in a video line relative to a timing reference of the video line, wherein an indication of the amount of the time shifting is associated with the HDTV signal and not recordable by at least some video recorders, for inhibiting the making of acceptable recordings of the HDTV signal therefrom, the apparatus comprising:

an input terminal for receiving the HDTV signal including the associated indication of the amount of time shifting;

modifier circuitry coupled to the input terminal and processing the HDTV signal so the indication of the amount of time shifting is modified so as to be recordable; and an output terminal coupled to the modifier circuitry for outputting the modified HDTV signal to a video recorder.

61. The apparatus of claim 60, wherein the modifier circuitry does one of:
   a) level shifting the indication;
   b) level shifting at least a portion of the indication;
   c) increasing an amplitude of at least a portion of the indication;
   d) placing the indication in an above black level portion of the HDTV signal;
   e) placing the indication in an active video portion of the HDTV signal;
   f) placing the indication in an audio channel associated with the HDTV signal; and
   g) encoding the indication and placing the encoded indication in a blanking interval of the HDTV signal.

* * * * *